United States Patent
Chiang et al.

(10) Patent No.: US 11,051,010 B2
(45) Date of Patent: Jun. 29, 2021

(54) MERGE CANDIDATES WITH MULTIPLE HYPOTHESIS

(71) Applicant: MediaTek Inc., Hsinchu (TW)

(72) Inventors: Man-Shu Chiang, Hsinchu (TW); Chih-Wei Hsu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/513,835

(22) Filed: Jul. 17, 2019

(65) Prior Publication Data

US 2020/0029073 A1 Jan. 23, 2020

Related U.S. Application Data

(60) Provisional application No. 62/699,760, filed on Jul. 18, 2018.

(51) Int. Cl.
*H04N 19/105* (2014.01)
*H04N 19/176* (2014.01)
*H04N 19/46* (2014.01)
*H04N 19/159* (2014.01)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
CPC .... H04N 19/105; H04N 19/176; H04N 19/46; H04N 19/159; H04N 19/11; H04N 19/52
See application file for complete search history.

(56) References Cited

U.S. PATENT DOCUMENTS

| | | | |
|---|---|---|---|
| 9,374,578 B1 | 6/2016 | Mukherjee et al. | |
| 2012/0320968 A1* | 12/2012 | Zheng | H04N 19/40 375/240.02 |

(Continued)

FOREIGN PATENT DOCUMENTS

| | | |
|---|---|---|
| CN | 101491107 A | 7/2009 |
| CN | 101755458 A | 6/2010 |

(Continued)

OTHER PUBLICATIONS

China National Intellectual Property Administration, International Search Report and Written Opinion for International Patent Application No. PCT/CN2019/096520, dated Sep. 30, 2019.

(Continued)

*Primary Examiner* — Jared Walker
(74) *Attorney, Agent, or Firm* — Oblon, McClelland, Maier & Neustadt, L.L.P.

(57) ABSTRACT

A video decoder receives to-be-decoded data from a bitstream for a block of pixels to be decoded as a current block of a current picture of the video. The video decoder generates a first prediction of the current block based on a first prediction mode that is selected from a first candidate list. The video decoder generates a second prediction of the current block based on a second prediction mode that is selected from a second candidate list. The video decoder generates a combined prediction for the current block based on the first prediction and the second prediction. The video decoder reconstructs the current block by using the combined prediction.

16 Claims, 18 Drawing Sheets

(56) References Cited

U.S. PATENT DOCUMENTS

| | | | | |
|---|---|---|---|---|
| 2012/0328023 A1* | 12/2012 | Srpljan | ................ | H04N 19/70 |
| | | | | 375/240.16 |
| 2013/0070854 A1* | 3/2013 | Wang | ................... | H04N 19/436 |
| | | | | 375/240.16 |
| 2017/0180737 A1* | 6/2017 | Ye | ...................... | H04N 19/159 |

FOREIGN PATENT DOCUMENTS

| | | | |
|---|---|---|---|
| CN | 102186070 | A | 9/2011 |
| CN | 102934440 | A | 2/2013 |
| CN | 104521237 | A | 4/2015 |
| CN | 107113425 | A | 8/2017 |

OTHER PUBLICATIONS

Taiwan Intellectual Property Office, Office Action for Taiwan Patent Application No. 108125411, dated Jul. 15, 2020.

\* cited by examiner

| Merge_index | L0 | L1 |
|---|---|---|
| 0 | mvL0_A, ref0 | - |
| 1 | - | mvL1_B, ref0 |
| 2 | | |
| 3 | | |
| 4 | | |

→

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

| Merge_index | L0 | L1 |
|---|---|---|
| 0 | mvL0_A, ref0 | - |
| 1 | - | mvL1_A, ref1 |
| 2 | | |
| 3 | | |
| 4 | | |

→

| Merge_index | L0 | L1 |
|---|---|---|
| 0 | mvL0_A, ref0 | - |
| 1 | - | mvL1_A, ref1 |
| 2 | mvL0_A, ref0 → mvL0'_A, ref0' | |
| 3 | mvL1'_A, ref1' ← mvL1_A, ref1 | |
| 4 | | |

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

| AMVP_index | L0 | L1 |
|---|---|---|
| 0 | mvL0_A | mvL1_A |
| 1 | mvL0_B | - |
| 2 | - | - |

↓

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | (0,0), ref0 | (0,0), ref0 |
| 4 | (0,0), ref1 | (0,0), ref1 |

↓

| AMVP_index | L0 | L1 |
|---|---|---|
| 0 | mvL0_A | mvL1_A |
| 1 | mvL0_B | (0,0) |
| 2 | (0,0) | - |

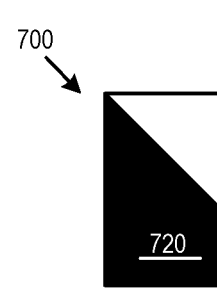
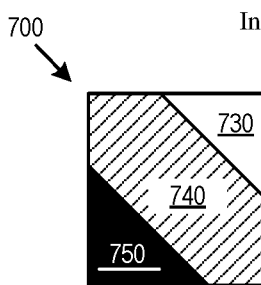
*Figure 7a*  *Figure 7b*
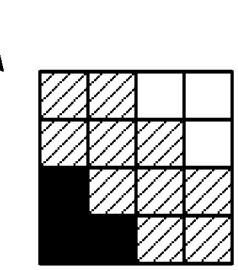
*Figure 8a*
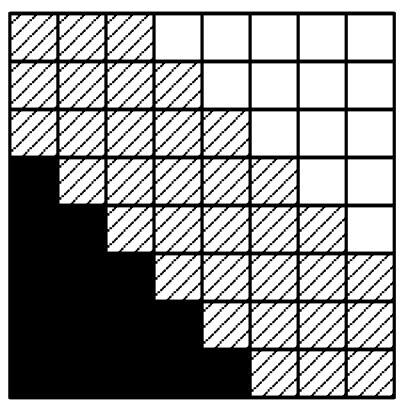
*Figure 8b*

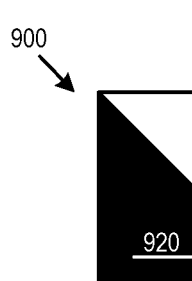
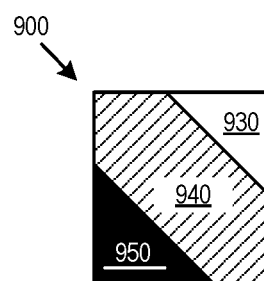
Figure 9a
Figure 9b
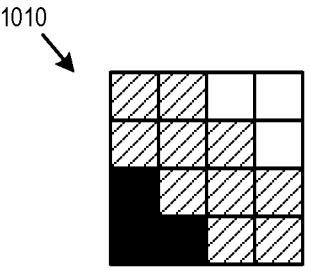
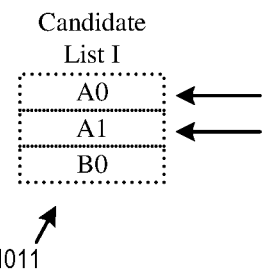
Figure 10a
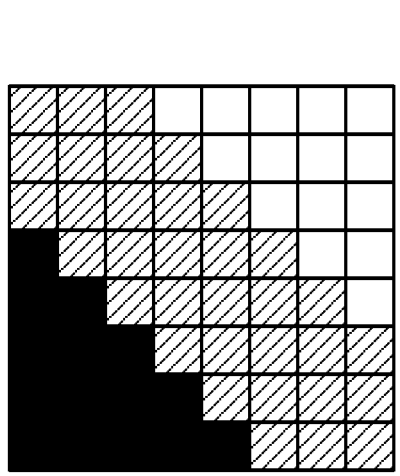
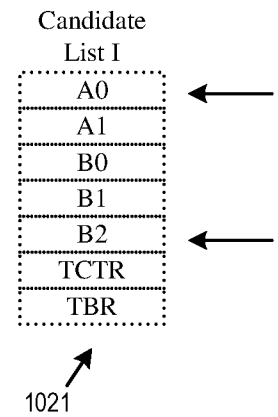
Figure 10b

MERGE CANDIDATES WITH MULTIPLE HYPOTHESIS

CROSS REFERENCE TO RELATED PATENT APPLICATION(S)

The present disclosure is part of a non-provisional application that claims the priority benefit of U.S. Provisional Patent Application No. 62/699,760, filed on 18 Jul. 2018. Contents of above-listed applications are herein incorporated by reference.

TECHNICAL FIELD

The present disclosure relates generally to video processing. In particular, the present disclosure relates to methods of coding a pixel block by using multiple hypothesis to perform inter prediction

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs). Each PU corresponds to a block of pixels in the CU.

To achieve the best coding efficiency of hybrid coding architecture, HEVC employs intra-prediction and/or inter-prediction modes for each PU. For intra-prediction modes, the spatial neighboring reconstructed pixels can be used to generate the directional predictions in 35 directions. For inter-prediction modes, motion information is used to reconstruct temporal reference frames, which are used to generate motion compensated predictions. Motion information may include motion vectors, motion vector predictors, motion vector differences, reference indices for selecting reference frames, etc.

There are three types of inter-prediction modes: skip mode, merge mode, and advanced motion vector prediction (AMVP) mode. Under AMVP mode, motion vectors (MVs) used for motion-compensated prediction of PUs are derived from motion vector predictors (MVPs) and motion vector differences (MVDs, or residual motion data) according to MV=MVP+MVD. For an AMVP-predicted PU, the MVP is selected from among a set of MVP candidates that includes two spatial candidates and one temporal candidate. An index that identifies the MVP selection is encoded and transmitted along with the corresponding MVD as motion information. Reference index for selecting a reference frame (or reference indices for selecting reference frames) from reference frame list L0 and/or L1 for bidirectional or unidirectional prediction is also encoded and transmitted as motion information.

When a PU is coded in either skip mode or merge mode, no motion information is transmitted except the merge index of the selected candidate. That is because skip mode and merge mode utilize motion inference methods (MV=MVP+MVD where MVD is zero) to obtain the motion information from spatially neighboring blocks (spatial candidates) or collocated blocks in temporally neighboring pictures (temporal candidates) that are selected from reference frame list L0 or L1 (indicated in slice header). In the case of a skip PU, the residual signal for the block being coded is also omitted. To relay motion information for a pixel block under HEVC by using AMVP, merge mode, or skip mode, an index is used to select an MVP (or motion predictor) from a list of candidate motion predictors. In merge/skip mode, a merge index is used to select an MVP from a list of candidate motion predictors that includes four spatial candidates and one temporal candidate. The merge index is transmitted, but motion predictors are not transmitted.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provides a video decoder that receives to-be-decoded data from a bitstream for a block of pixels to be decoded as a current block of a current picture of the video. The video decoder generates a first prediction of the current block based on a first prediction mode that is selected from a first candidate list comprising one or more candidate inter-prediction modes. The video decoder generates a second prediction of the current block based on a second prediction mode that is selected from a second candidate list comprising one or more candidate intra-prediction modes that are identified based on a property of the current block. The video decoder generates a combined prediction for the current block based on the first prediction and the second prediction. The video decoder reconstructs the current block by using the combined prediction. In some embodiments, the video decoder determines whether to generate the second prediction based on an explicit flag in the bitstream.

The video decoder may determine whether to generate the second prediction based on a width, a height, or a size of the current block. The video decoder may determine an ordering of the second candidate list based on a width, a height, or a size of the current block, or based on a direction of the selected first prediction mode. The video decoder may also determine a number of candidates of the second candidate list of the current block based on a width, a height, or a size of the current block. The video decoder may signal a candidate at a particular position of the second candidate by using a shortest code word.

In some embodiments, the second candidate list comprises no more than one candidate intra-prediction mode when a size of the current block is less than a threshold, and the one candidate intra-prediction mode is identified based on a ratio between a width of the current block and a height of the current block. In some embodiments, the combined prediction is applicable only to a sub-region of the current block, the size of the sub-region is determined based on a size of the current block.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIGS. 7a-b each conceptually illustrates coding of a block when only a sub-region of the block uses combined predictions of MH mode for Intra.

FIGS. 8a-b each conceptually illustrates the application of MH mode for Intra for blocks of different sizes, consistent with an exemplary embodiment.

FIGS. 9a-b each conceptually illustrates coding of a block when only a sub-region of the block uses combined predictions of MH mode for Inter.

FIGS. 10a-b each conceptually illustrates the application of MH mode for Inter for blocks of different sizes, consistent with an exemplary embodiment.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Inter-Prediction Modes

Figure 1:
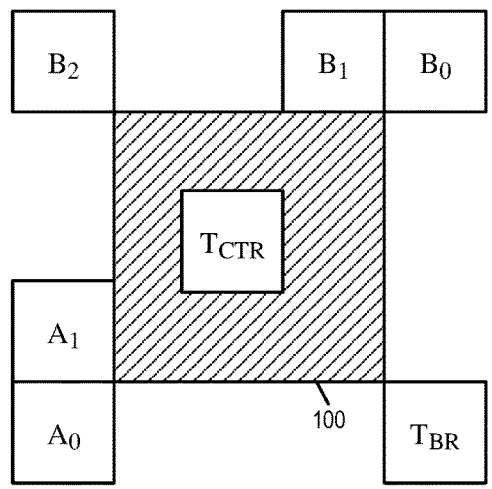
FIG. 1 shows the MVP candidates set for inter-prediction modes in HEVC.

FIG. 1 shows the MVP candidates set for inter-prediction modes in HEVC (i.e., skip, merge, and AMVP). The figure shows a current block 100 of a video picture or frame being encoded or decoded. The current block 100 (which can be a PU or a CU) refers to neighboring blocks to derive the spatial and temporal MVPs for AMVP mode, merge mode or skip mode.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 2:
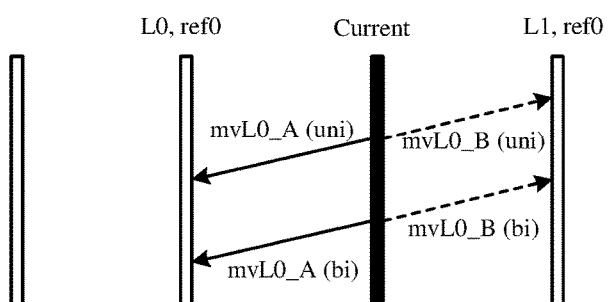
FIG. 2 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 2 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 3, 4:
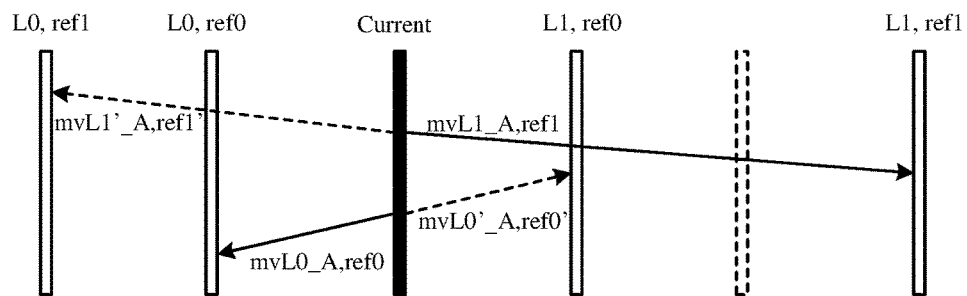
FIG. 3 illustrates a merge candidates list that includes scaled merge candidates.
FIG. 4 illustrates an example in which zero vector candidates are added to a merge candidates list or an AMVP candidates list.

For derived candidate type 2, scaled merge candidates are created by scaling original merge candidates. FIG. 3 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 4 illustrates an example in which zero vector candidates are added to a merge candidates list or an AMVP candidates list.

Intra-Prediction Mode

Intra-prediction method exploits one reference tier adjacent to the current prediction unit (PU) and one of the intra-prediction modes to generate the predictors for the current PU. The Intra-prediction direction can be chosen among a mode set containing multiple prediction directions. For each PU coded by Intra-prediction, one index will be used and encoded to select one of the intra-prediction modes. The corresponding prediction will be generated and then the residuals can be derived and transformed.

Figure 5:
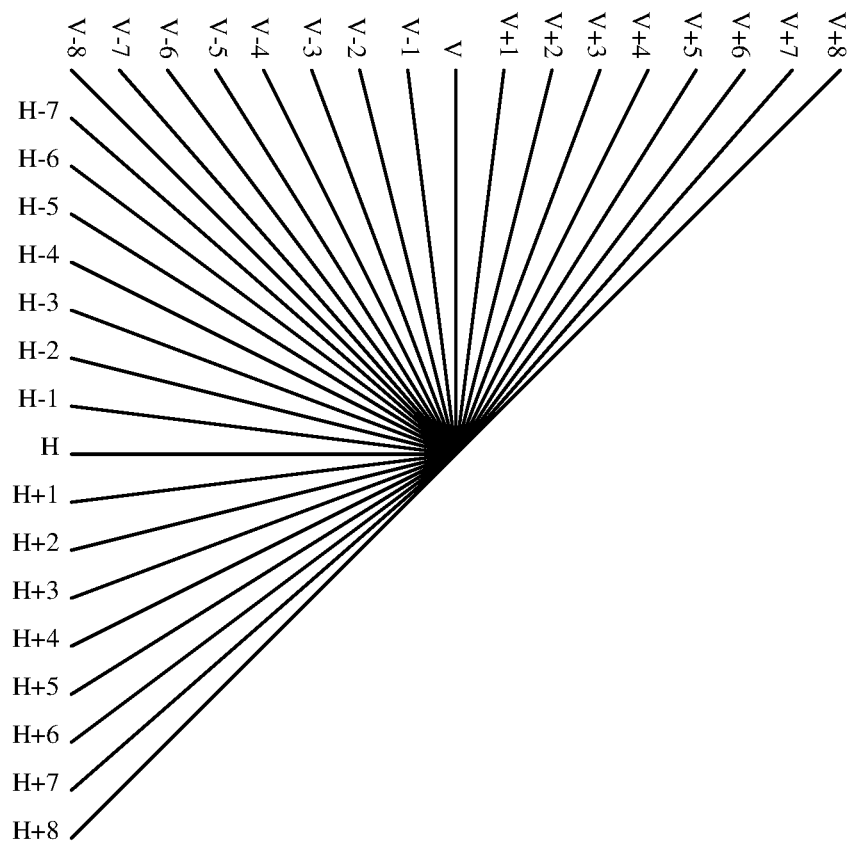
FIG. 5 shows the intra-prediction modes in different directions.

FIG. 5 shows the intra-prediction modes in different directions. These intra-prediction modes are referred to as directional modes and do not include DC mode or Planar mode. As illustrated, there are 33 directional modes (V: vertical direction; H: horizontal direction), so H, H+1~H+8, H-1~H-7, V, V+1~V+8, V-1~V-8 are used. Generally directional modes can be represented as either as H+k or V+k modes, where k=±1, ±2, . . . , ±8. (In some embodiments, intra-prediction mode has 65 directional modes so that the range of k is from ±1 to ±16.)

Out of the 35 intra-prediction modes in HEVC, 3 modes are considered as the most probable modes (MPM) for predicting the intra-prediction mode in current prediction block. These three modes are selected as an MPM set. For example, the intra-prediction mode used in the left prediction block and the intra-prediction mode used in the above prediction block are used as MPMs. When the intra-prediction modes in two neighboring blocks use the same intra-prediction mode, the intra-prediction mode can be used as an MPM. When only one of the two neighboring blocks is available and coded in directional mode, the two neighboring directions immediately next to this directional mode can be used as MPMs. DC mode and Planar mode are also considered as MPMs to fill the available spots in the MPM set, especially if the above or top neighboring blocks are not available or not coded in intra-prediction, or if the intra-prediction modes in neighboring blocks are not directional modes. If the intra-prediction mode for current prediction block is one of the modes in the MPM set, 1 or 2 bits are used to signal which one it is. Otherwise, the intra-prediction mode of the current block is not the same as any entry in the MPM set, and the current block will be coded as a non-MPM mode. There are all-together 32 such non-MPM modes and a (5-bit) fixed length coding method is applied to signal this mode.

Multi-Hypothesis Mode

Some embodiments of the disclosure provide a Multi-hypothesis mode to improve Inter prediction, which is an improved method for Skip and/or Merge modes. In original Skip and Merge mode, one Merge index is used to select one motion candidate, which may be either uni-prediction or bi-prediction derived by the candidate itself, from the Merge candidate list. The generated motion compensated predictor is referred to as the first hypothesis (or first prediction) in some embodiments. Under Multi-hypothesis mode, a second hypothesis is produced in addition to the first hypothesis. The second hypothesis of predictors can be generated by motion compensation from a motion candidate or an inter prediction mode, (e.g., Merge or Skip modes). The second hypothesis of predictors can also be generated by an Intra prediction mode from Intra modes. When Multi-hypothesis mode is supported, one or more than one Multi-hypothesis candidate(s) may be available for Skip and/or Merge mode. When the second hypothesis (or second prediction) is generated by an Intra prediction mode, the Multi-hypothesis mode is referred to as MH mode for Intra or MH Intra. When the second hypothesis is generated by motion compensation by a motion candidate or an inter prediction mode (e.g., Merge or Skip mode), the Multi-hypothesis mode is referred to as MH mode for Inter or MH mode Inter (or also called as MH mode for Merge or MH Merge).

For MH mode for Intra, each Multi-hypothesis candidate (or called each candidate with Multi-hypothesis) contains one motion candidate and one Intra prediction mode, where the motion candidate is selected from Candidate List I and the Intra prediction mode is selected from Candidate List II. That is, one motion candidate may match one or more intra prediction mode(s).

For MH mode for Inter, each Multi-hypothesis candidate (or called each candidate with Multi-hypothesis) contains two motion candidates. In some embodiments, Candidate List I is identical to the Merge candidates list of the current block and that both motion candidates of a Multi-hypothesis candidate of MH mode Inter are selected from Candidate List I. In some embodiments, the Candidate List I is a subset of the Merge candidate list and that a first motion candidate of a Multi-hypothesis candidate is selected from the Merge candidate list and a second motion candidate of the same Multi-hypothesis candidate is selected from Candidate List I.

Figure 6A:
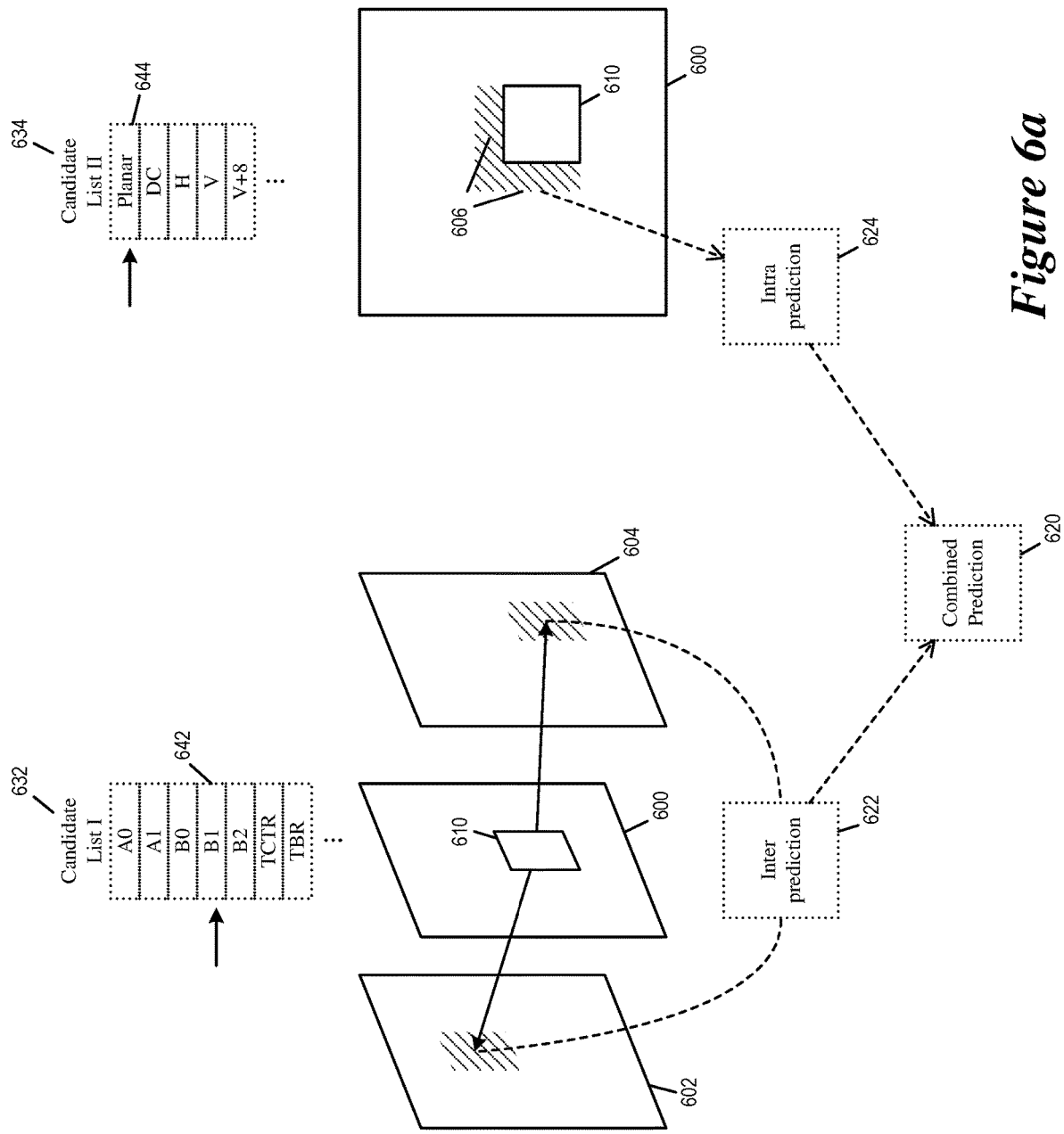
FIGS. 6a-b each conceptually illustrates encoding or decoding a block of pixels by using multi-hypothesis mode.
Figure 6B:
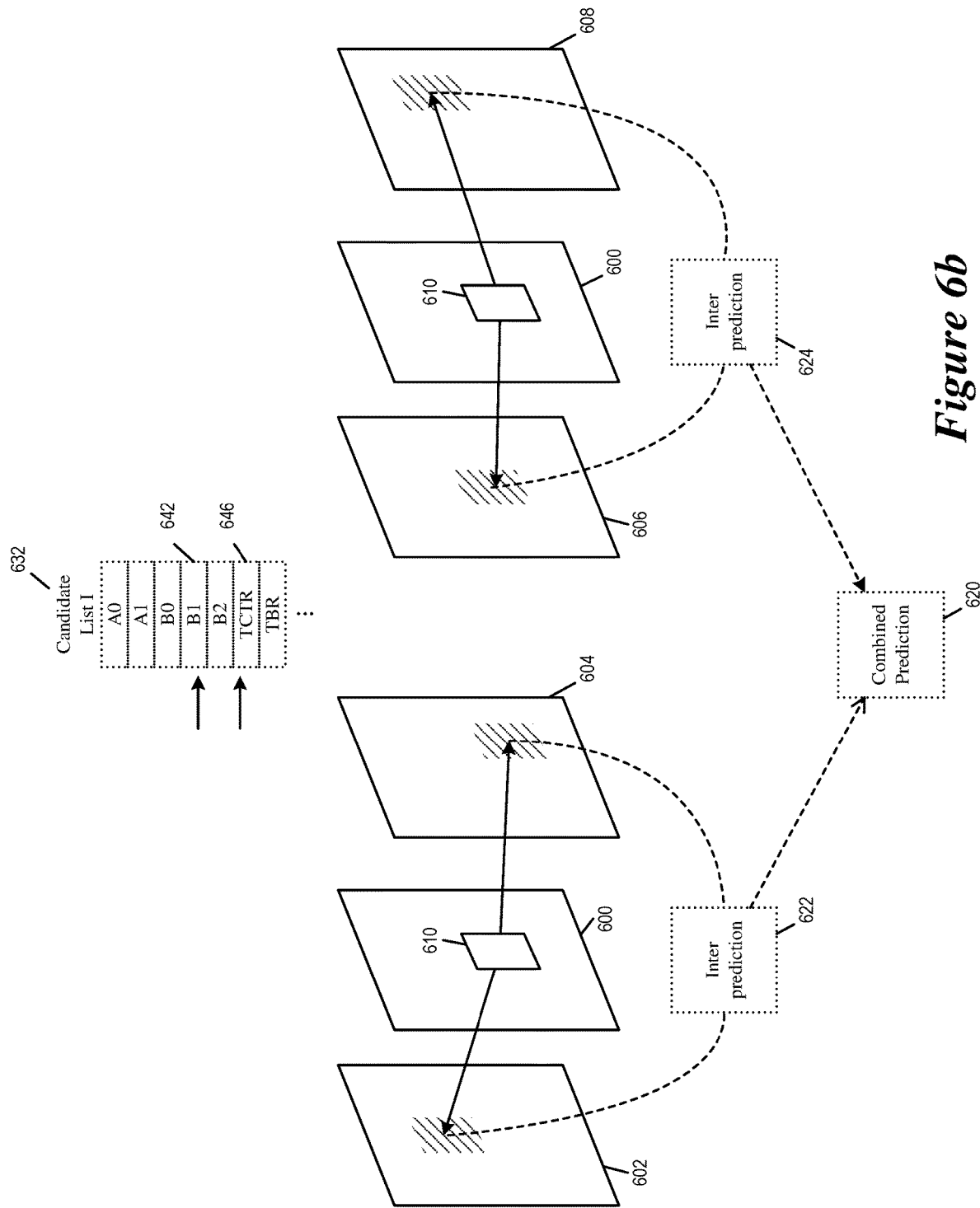

FIGS. 6*a*-*b* each conceptually illustrate encoding or decoding a block of pixels by using multi-hypothesis modes. The figure illustrates a video picture 600 that is currently being encoded or decoded by a video coder. The video picture 600 includes a block of pixels 610 that is currently being encoded or decoded as a current block. The current block 610 is coded by MH mode, specifically, a combined prediction 620 is generated based on a first prediction 622 (first hypothesis) of the current block 610 and a second prediction 624 (second hypothesis) of the current block 610. The combined prediction 620 is then used to reconstruct the current block 610.

FIG. 6*a* illustrates the current block 610 being coded by using MH mode for Intra. Specifically, the first prediction is obtained by inter-prediction based on at least one of reference frames 602 and 604. The second prediction is obtained by intra-prediction based on neighboring pixels 606 of the current block 610. As illustrated, the first prediction 622 is generated based on an inter-prediction mode or a motion candidate 642 (first prediction mode) that is selected from a first candidate list 632 (Candidate List I) comprising one or more candidate inter-prediction modes. The second prediction 624 is generated based on an intra-prediction mode 644 (second prediction mode) that is selected from a second candidate list 634 (Candidate List II) comprising one or more candidate intra-prediction modes.

FIG. 6*b* illustrates the current block 610 being coded by using MH mode for Inter. Specifically, the first prediction 622 is obtained by inter-prediction based on at least one of reference frames 602 and 604. The second prediction 624 is obtained by inter-prediction based on at least one of reference frames 606 and 608. As illustrated, the first prediction 622 is generated based on an inter-prediction mode or a motion candidate 642 (first prediction mode) that is selected from the first candidate list 632 (Candidate List I). The second prediction 624 is generated based on an inter-prediction mode or a motion candidate 646 (second prediction mode) that is also selected from the first candidate list 632 (Candidate List I).

In some embodiments, when MH mode for Intra is supported, one flag is signaled to represent whether MH mode for Intra is applied. Such a flag may be represented or indicated by a syntax element in a bitstream. If the flag is on, one additional Intra mode index is signaled to indicate the Intra prediction mode from Candidate List II.

In some embodiments, for MH Intra or MH Inter, the indices that are used to select the first prediction mode and the second prediction mode are separately and distinctly signaled, e.g., as two syntax elements in a bitstream that encodes the video picture 600. For example, a first syntax element may be used to indicate the selection of the first candidate 642 from the first candidate list 632 and a second syntax element may be used to indicate the selection of the second candidate 644 from the second candidate list 634 (or the first candidate list 632).

In some embodiments, when MH mode for Intra is applied, Candidate List I may be the same as that for normal Merge mode or be a subset of that for normal Merge mode. For example, Candidate List I may contain only spatial candidates (e.g., A0, A1, B0, B1, and B2) and/or temporal candidates (TBR and TCTR). For another example, Candidate List I may exclude extended modes that are not used in HEVC. In some embodiments, when MH mode for Intra is applied, Candidate List II can be the same as that for normal Intra modes (33 or 65 directional modes in addition to planar and DC modes) or be a subset of that for normal Intra modes.

In some embodiments, MH mode for Intra is supported without additional syntax. For example, the first candidate list 632 and the second candidate list 634 are incorporated into the Merge candidate list, such that each candidate for MH mode for Intra can be inserted or included into the Merge candidate list and be indicated or selected by the Merge index for the original Skip and Merge mode. The length (L) of the Merge candidate list can be kept the same or be extended to L+N, where N is a positive number (of the additional candidates inserted for MH mode) and may vary with a predetermined rule such as block width and/or block height.

In some embodiments, MH mode for Intra is supported without additional syntax. Each candidate for MH mode for Intra can be inserted into the Merge candidate list according to a predefined rule or order and be indicated or selected by the Merge index for original Skip and Merge mode, i.e., one single merge index can be used to select one single inter-prediction mode for single hypothesis (e.g., $B_1$) or to select one inter-prediction and one intra-prediction as a pair (e.g., $B_1$, Planar) for MH Intra. In some embodiments, according to a predefined rule, each candidate for MH mode for Intra may be inserted adjacent to the corresponding motion candidate in the merge candidate list such that the merge candidate list is formed as follows: $A_0$, ($A_0$, Planar), ($A_0$, DC), . . . , $A_1$, ($A_1$, Planar), ($A_1$, DC), $B_0$, ($B_0$, Planar), ($B_0$, DC), . . . , $B_1$, ($B_1$, Planar), ($B_0$, DC), . . . , where Candidate List I={$A_0$, $A_1$, $B_0$, $B_1$, . . . }, Candidate List II={Planar, DC, . . . }, and each of ($A_0$, Planar), ($A_0$, DC), ($A_1$, Planar), ($A_1$, DC), ($B_0$, Planar), ($B_0$, DC), ($B_1$, Planar), ($B_0$, DC) represents a Multi-hypothesis candidate (or called a candidate with Multi-hypothesis). In some embodiments, according to the predefined rule, the candidates for MH mode for Intra can be inserted at a specific position of the Merge candidate list. For example, the candidates for MH mode for Intra can follow the spatial candidates, the temporal candidates, candidate type 1, candidate type 2, or candidate type 3, etc. In some embodiments, the candidates for MH mode for Intra can be inserted into the merge candidate list at any position or with a predefined order.

In some embodiments, when MH mode for Intra is applied, one Intra prediction mode is selected from the Candidate List II based on a predetermined order. For example, an Intra prediction mode at a particular position of the second candidate list 634 (e.g., in front of or at the beginning of Candidate List II) can be implicitly decided as the chosen Intra prediction mode or be signaled by using a shortest code word. In the example of FIG. 6a, the candidate 644 in the second candidate list 634 may be implicitly selected as the intra-prediction mode for MH mode for Intra or be assigned a shortest code word, because the candidate 644 is at the beginning or the front of the second candidate list 634.

The order of candidates in the Candidate List II may depend on or be established based on criteria such as the direction of the corresponding motion candidate (selected from the Candidate List I) or the width, height, or size of the current block 610. For example, when the block width is much larger than the block height, the candidate for MH mode for Intra, whose Intra directional mode is nearing the vertical direction, may be inserted in the Candidate List II prior to those whose Intra directional mode is nearing the horizontal direction; otherwise, the contrary way is applied. In other words, when the ratio between the block width and the block height is greater than a certain threshold, candidates in the candidates list II are positioned such that intra modes nearing the vertical direction (e.g., directional modes "V", "V-1", etc.) are placed in front of intra modes nearing the horizontal direction (e.g., directional modes "H", "H-1", etc.); when the ratio between the block width and the block height is smaller than a certain threshold, candidates in the candidates list II are positioned such that intra modes nearing the horizontal direction are placed in front of intra modes nearing the vertical direction. For another example, for those Intra prediction modes with the same motion candidates, when the MVP of the motion candidate is from left neighboring block, the candidate whose Intra directional mode is nearing the horizontal direction may be inserted prior to those whose Intra directional mode is nearing the vertical direction.

The size of Candidate List II or the number of intra/directional modes within Candidate List II may vary with the block width or block height or the number of available modes for normal Intra mode. For example, when the block size is larger than a predetermined threshold, one Intra mode index is signaled to indicate or select one Intra prediction mode from multiple intra prediction modes in Candidate List II; otherwise, only one Intra prediction mode is allowed to be in Candidate List II for MH Intra. In some embodiments, when Candidate List II contains only one candidate Intra mode, the target Intra prediction mode selected from Candidate List II for MH mode for Intra can be implicitly assigned instead of explicitly signaled. For those small blocks, the one candidate intra-prediction mode is identified based on a ratio between the block width and the block height. For example, if the block width is much larger than the block height (e.g., ratio of width/height is greater than a threshold), that one Intra prediction mode is assigned the vertical mode (e.g., intra directional mode "V"); and if the block height is much larger than the block width (e.g., ratio of width/height is less than a threshold), that one Intra prediction mode is assigned the horizontal mode (e.g., intra directional mode "H"). For other small blocks, that one Intra prediction mode is assigned the planar mode.

In some embodiments, when block portion settings are applied to MH mode (such as MH mode for Intra or MH mode for Merge), only sub-region of the whole block may be added for the hypothesis. The sub-region may be formed by several continuous sub-blocks or several separate sub-blocks. For example, the sub-region includes the block area exclusive of the boundary. For another example, the sub-region includes the sub-blocks nearing the center of block. For still another example, the sub-region includes the sub-blocks at the corners. For another example, the sub-region includes the sub-blocks along one direction such as diagonal direction, inverse diagonal direction, horizontal direction, vertical direction, or any direction from 33 or 65 intra directional modes.

FIGS. 7a-b each conceptually illustrates coding of a block 700 when only a sub-region of the block uses combined predictions of MH mode (such as MH mode for Intra or MH mode for Merge). FIG. 7a illustrates two prediction units 710 and 720 in the block 700. The first prediction unit 710 is illustrated as a triangle at upper right part of the block 700 and the second prediction unit 720 is illustrated as a triangle at lower left part of the block 700. The prediction unit 710 is coded by inter-prediction, while the prediction unit 720 may be coded by inter-prediction or intra-prediction.

FIG. 7b illustrates the block 700 being coded when MH mode (such as MH Intra or MH mode for Merge) is turned on. As illustrated, the block 700 is divided into three sub-regions 730, 740, and 750. The sub-region 730 corresponds to the prediction unit 710 and is coded by inter-prediction (e.g., merge mode) only without using intra-prediction. The sub-region 750 corresponds to prediction unit 720 and is coded by intra-prediction or inter-prediction. The sub-region 740 is an overlap region of the prediction unit 710 and the prediction 720. If the prediction unit 720 is coded by intra prediction, the overlap region 740 is coded by MH mode for Intra, i.e., by combined prediction of the inter prediction of the first prediction unit 710 and the intra prediction of the second prediction unit 720. If the prediction unit 720 is coded by inter prediction, the overlap region 740 is coded by MH mode for Inter (also called as MH mode for Merge or MH Merge), i.e., by combined prediction of the inter prediction of the first prediction unit 710 and the inter prediction of the second prediction unit 720.

In some embodiments, the size of the overlap sub-region (e.g., sub-region 740 of block 700) for which the combined prediction of MH mode (such as MH Intra or MH mode for Merge) is applied varies based on size of the block or may be determined based on a size of the current block. The size of the overlap sub-region may be referred to as block portion setting. Specifically, the portion of the block (i.e., the overlap sub-region 740) can be expanded or shrunk depending on certain criteria such as block width or block height or block size. In some embodiments, for a smaller block, such a sub-region for MH mode is smaller than a sub-region for MH mode of a larger block.

FIGS. 8a-b each conceptually illustrate the application of MH mode for Intra for blocks of different sizes, consistent with an exemplary embodiment. The figures illustrate different sized blocks having different sized sub-regions for which the MH Intra is applied. The figures also illustrate different sized blocks having candidates lists with different numbers of candidates for applying MH Intra. Specifically, the size of Candidate List I and/or Candidate List II varies with the size, height, or width of the block.

FIG. 8a illustrates a 4×4 block 810 coded by MH mode for Intra. As illustrated, top-right three sub-blocks or pixels of the block 810 (illustrated as unshaded) are coded by inter-prediction, while lower left three sub-blocks or pixels of the block 810 (illustrated as darkened) are coded by intra-prediction. The middle ten pixels or sub-blocks of the block 810 (illustrated as hashed) are coded by combined prediction of MH mode. Since MH mode for Intra is used, an inter-prediction mode and an intra-prediction mode are respectively selected from a candidate list 811 (Candidate List I) and a candidate list 812 (Candidate List II). Since the candidate list 812 has only one candidate, the selection of that one candidate is inferred without explicit signaling in the bitstream when MH Intra is used.

FIG. 8b illustrates a larger 8×8 block 820 coded by MH mode for Intra. As illustrated, top-right 15 sub-blocks or pixels of the block 820 (illustrated as unshaded) are coded by inter-prediction, while lower-left 15 sub-blocks or pixels of the block 820 (illustrated as darkened) are coded by intra-prediction. The middle 34 pixels or sub-blocks of the block 820 (illustrated as hashed) are coded by combined prediction. Since MH mode for Intra is used, an inter-prediction mode and an intra-prediction mode are respectively selected from a candidate list 821 (Candidate List I) and a candidate list 822 (Candidate List II). For the 8×8 block 820, the Candidate List I has 7 candidates, while the Candidate List II has 5 candidates.

The larger block 820 has a larger overlap region (in which sub-blocks or pixels are coded by combined prediction) than the smaller block 810. In addition, at least one of the candidate lists (Candidate List I and/or Candidate List II) of the larger block 820 has more candidates than at least one of the candidate lists of the smaller block 810.

FIGS. 9a-b each conceptually illustrates coding of a block 900 when only a sub-region of the block uses combined predictions of MH Inter (also called as MH mode for Merge or MH Merge). FIG. 9a illustrates two prediction units 910 and 920 in the block 900. The prediction unit 910 is illustrated as a triangle at upper right part of the block 900 and the prediction unit 920 is illustrated as a triangle at lower left part of the block 900. The prediction unit 910 is coded by a first inter-prediction mode while the prediction unit 920 is coded by a second intra-prediction mode.

FIG. 9b illustrates the block 900 being coded when MH Inter is turned on. As illustrated, the block 910 is divided into three sub-regions 930, 940, and 950. The sub-region 930 corresponds to the prediction unit 910 and is coded by the first inter-prediction mode. The sub-region 950 corresponds to prediction unit 920 and is coded by the second inter-prediction mode. The sub-region 940 is an overlap region of the prediction unit 910 and the prediction 920 and is coded by the combined prediction of the first and second inter-prediction modes.

In some embodiments, the size of the overlap sub-region (e.g., sub-region 940 of block 900) for which the combined prediction is applied varies based on size of the block or may be determined based on a size of the current block. The size of the overlap sub-region may be referred to as block portion setting. Specifically, the portion of the block (i.e., the overlap sub-region 940) can be expanded or shrunk depending on certain criteria such as block width or block height or block size. In some embodiments, for a smaller block, such a sub-region is smaller than a sub-region of a larger block.

FIGS. 10a-b each conceptually illustrates the application of MH Inter (also called as MH mode for Merge or MH Merge) for blocks of different sizes, consistent with an exemplary embodiment. The figures illustrates different sized blocks having different sized sub-regions for which the MH Inter is applied. The figure also illustrates different sized blocks having candidates lists with different numbers of candidates for applying MH Inter.

FIG. 10a illustrates a 4×4 block 1010 coded by MH mode for Inter. As illustrated, top-right three sub-blocks or pixels of the block 1010 (illustrated as unshaded) are coded by a first inter-prediction mode, while lower left three sub-blocks or pixels of the block 1010 (illustrated as darkened) are coded by a second inter-prediction mode. The middle ten pixels or sub-blocks of the block 1010 (illustrated as hashed) are coded by combined prediction. The first inter-prediction mode and the second inter-prediction mode for the MH Inter of the block 1010 are selected from a candidate list 1011 (Candidate List I).

FIG. 10b illustrates a larger 8×8 block 1020 coded by MH mode for Inter. As illustrated, top-right 15 sub-blocks or pixels of the block 1020 (illustrated as unshaded) are coded by a first inter-prediction mode, while lower-left 15 sub-blocks or pixels of the block 1020 (illustrated as darkened) are coded by a second inter-prediction mode. The middle 34 pixels or sub-blocks of the block 1020 (illustrated as hashed) are coded by combined prediction (or MH mode for Inter). The first and second inter-prediction modes for the MH Inter of the block 1020 are selected from a candidate list 1021 (Candidate List I).

The larger block 1020 has a larger overlap region (in which sub-blocks or pixels are coded by combined prediction or MH Inter) than the smaller block 1010. In some embodiments, the candidate list 1011 of the smaller block 1010 (Candidate List I with three candidate) is smaller than the candidate list 1021 of the larger block 1020 (Candidate List I with seven candidates).

In some embodiments, the block has a forbidden setting that specifies the condition for disabling MH mode for Intra or MH mode for Merge. These conditions may depend on block width, block height, or block size.

In some embodiments, when adding or averaging inter-prediction, an intra-prediction or combination thereof to produce the combined prediction under MH Intra or MH Merge (e.g., for the overlap region 740), the inter-prediction values and/or the intra-prediction values at different pixel or sub-block positions may be weighted differently depending on the position of the pixels or sub-blocks. In some embodiments, the regions of the block that are encoded by inter-prediction only or intra-prediction only may be implemented as regions whose weights for intra-prediction or inter-prediction are zero when performing MH mode for Intra.

In some embodiments, when adding or averaging a first inter-prediction with a second inter-prediction to produce the combined prediction under MH Merge (e.g., for the overlap region 940), the inter-prediction values from the first motion candidate and the inter-prediction values from the second motion candidate at different pixel or sub-block positions may be weighted differently depending on the position of the pixels or sub-blocks. In some embodiments, the regions of the block that are encoded by inter-prediction from the first motion candidate only or inter-prediction from the second motion candidate only may be implemented as regions whose weights for inter-prediction from the second motion candidate or inter-prediction from the first motion candidate are zero when performing MH mode for Inter.

In some embodiments, when motion settings are applied to MH mode for Merge, the hypothesis, which is generated by the motion candidate satisfying a predefined motion conditions, can be used for MH mode for Merge. The motion condition can be that the reference picture is the same as that for the other hypothesis or the motion vectors are within a predefined region, or any combination of above.

When MH mode for Intra or MH mode for Merge is supported, some settings such as prediction direction settings, different tap settings, block portion settings, motion settings, forbidden settings, or any combination of above can be applied to any one of the hypotheses or both of the hypotheses of MH mode for Intra or MH mode for Merge. Those settings can be used to meet different motion compensation bandwidth or computational complexity of MH mode for Intra or MH mode for Merge. Those settings can be enabled depending on implicit or explicit signaling. In one embodiment, the implicit assignment may depend on the block width or block height or block size. For example, the settings are applied to small blocks instead of large blocks. In some embodiments, the explicit signaling may depend on a flag or syntax element at CU level, slice level, picture level, sequence parameter set (SPS) level, or picture parameter set (PPS) level of the bitstream that encodes the video picture.

In some embodiments, when the prediction direction settings are applied to MH mode for Intra or MH mode for Merge, only uni-prediction with one predefined reference list is used for the hypothesis of MH mode for Intra or MH mode for Merge. In some embodiments, when different tap settings are applied to MH mode for Intra or MH mode for Merge, shorter length of the sub-pel interpolation filter for motion compensation (MC) can be used to replace the original interpolation filter for MC. For example, integer-pel MC can be used instead of the sub-pel MC.

In some embodiments, when forbidden settings are applied to MH mode (such as MH mode for Intra or MH mode for Merge), the hypotheses are not added (e.g., the first prediction and the second prediction are not added). That is, the forbidden setting can be viewed as disabling MH mode for intra or MH mode for Merge in some conditions. The conditions can depend on the block width or block height or block size. For example, when the block is smaller than N×M, MH mode for Intra or MH mode for Merge is disabled, where N can be 4 or 8 and M can be 4 or 8. For example, when the block is larger than N×M, MH mode for Intra or MH mode for Merge is disabled, where N can be 4, 8, 16, 32, 64, or 128 and M can be 4, 8, 16, 32, 64, or 128. In some embodiments, N×M can be represented as a block size threshold generated by the result of N×M. For example, for the block area is larger than 16, 32, 64, 128, 256, 512, or 1024, MH mode for Intra or MH mode for Merge is disabled. For example, for the block area is smaller than 16, 32, 64, 128, 256, 512, or 1024, MH mode for Intra or MH mode for Merge is disabled.

In some embodiments, the combined settings for MH mode for Intra or MH mode for Merge may have many possible combinations. An example combination is different tap settings and block portion settings. That is, different lengths of sub-pel interpolation filters can be applied to different portions of the block. For example, for the sub-region on the boundary of the block, integer-pel MC is used, for the sub-region nearing the center of block, longer length of sub-pel interpolation filter is used, and for the rest sub-region, shorter length of sub-pel interpolation filter is used.

Any of the foregoing proposed methods can be implemented in encoders and/or decoders. For example, any of the proposed methods can be implemented in an inter coding module or intra coding module of an encoder, a motion compensation module, a merge candidate derivation module of a decoder. Alternatively, any of the proposed methods can be implemented as a circuit coupled to the inter coding module or intra coding module of an encoder and/or motion compensation module, a merge candidate derivation module of the decoder.

Example Video Encoder

Figure 11:
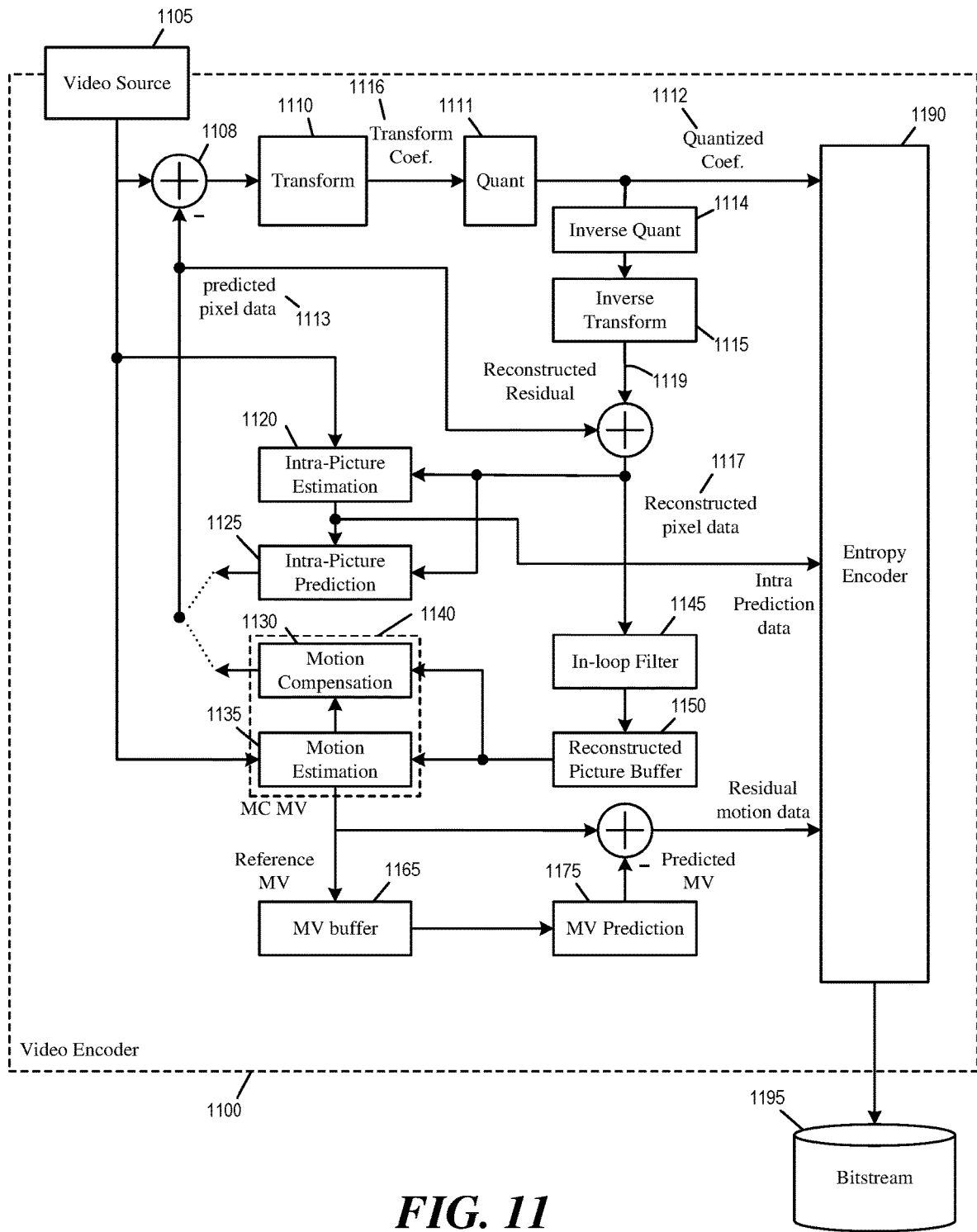
FIG. 11 illustrates an example video encoder that may implement MH mode.

FIG. 11 illustrates an example video encoder 1100 that may implement MH mode (MH Intra and/or MH Inter). As illustrated, the video encoder 1100 receives input video signal from a video source 1105 and encodes the signal into bitstream 1195. The video encoder 1100 has several components or modules for encoding the signal from the video source 1105, including at least part of a transform module 1110, a quantization module 1111, an inverse quantization module 1114, an inverse transform module 1115, an intra-picture estimation module 1120, an intra-prediction module 1125, a motion compensation module 1130, a motion estimation module 1135, an in-loop filter 1145, a reconstructed picture buffer 1150, a MV buffer 1165, and a MV prediction module 1175, and an entropy encoder 1190. The motion compensation module 1130 and the motion estimation module 1135 are part of an inter-prediction module 1140.

In some embodiments, the modules 1110-1190 are modules of software instructions being executed by one or more processing units (e.g., a processor) of a computing device or electronic apparatus. In some embodiments, the modules 1110-1190 are modules of hardware circuits implemented by one or more integrated circuits (ICs) of an electronic apparatus. Though the modules 1110-1190 are illustrated as being separate modules, some of the modules can be combined into a single module.

The video source 1105 provides a raw video signal that presents pixel data of each video frame without compression. A subtractor 1108 computes the difference between the raw video pixel data of the video source 1105 and the predicted pixel data 1113 from the motion compensation module 1130 or intra-prediction module 1125. The transform module 1110 converts the difference (or the residual pixel data or residual signal 1109) into transform coefficients (e.g., by performing Discrete Cosine Transform (DCT), Discrete Sine Transform (DST) or any other transform function). The quantization module 1111 quantizes the transform coefficients into quantized data (or quantized coefficients) 1112, which is encoded into the bitstream 1195 by the entropy encoder 1190.

The inverse quantization module 1114 de-quantizes the quantized data (or quantized coefficients) 1112 to obtain transform coefficients, and the inverse transform module 1115 performs inverse transform on the transform coefficients to produce reconstructed residual 1119. The reconstructed residual 1119 is added with the predicted pixel data 1113 to produce reconstructed pixel data 1117. In some embodiments, the reconstructed pixel data 1117 is temporarily stored in a line buffer (not illustrated) for intra-picture prediction and spatial MV prediction. The reconstructed pixels are filtered by the in-loop filter 1145 and stored in the reconstructed picture buffer 1150. In some embodiments, the reconstructed picture buffer 1150 is a storage external to the video encoder 1100. In some embodiments, the reconstructed picture buffer 1150 is a storage internal to the video encoder 1100.

The intra-picture estimation module 1120 performs intra-prediction based on the reconstructed pixel data 1117 to produce intra prediction data. The intra-prediction data is provided to the entropy encoder 1190 to be encoded into bitstream 1195. The intra-prediction data is also used by the intra-prediction module 1125 to produce the predicted pixel data 1113.

The motion estimation module 1135 performs inter-prediction by producing MVs to reference pixel data of previously decoded frames stored in the reconstructed picture buffer 1150. These MVs are provided to the motion compensation module 1130 to produce predicted pixel data.

Instead of encoding the complete actual MVs in the bitstream, the video encoder 1100 uses MV prediction to generate predicted MVs, and the difference between the MVs used for motion compensation and the predicted MVs is encoded as residual motion data and stored in the bitstream 1195.

The MV prediction module 1175 generates the predicted MVs based on reference MVs that were generated for encoding previously video frames, i.e., the motion compensation MVs that were used to perform motion compensation. The MV prediction module 1175 retrieves reference MVs from previous video frames from the MV buffer 1165. The video encoder 1100 stores the MVs generated for the current video frame in the MV buffer 1165 as reference MVs for generating predicted MVs.

The MV prediction module 1175 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1195 by the entropy encoder 1190.

The entropy encoder 1190 encodes various parameters and data into the bitstream 1195 by using entropy-coding techniques such as context-adaptive binary arithmetic coding (CABAC) or Huffman encoding. The entropy encoder 1190 encodes various header elements, flags, along with the quantized transform coefficients 1112, and the residual motion data as syntax elements into the bitstream 1195. The bitstream 1195 is in turn stored in a storage device or transmitted to a decoder over a communications medium such as a network.

The in-loop filter 1145 performs filtering or smoothing operations on the reconstructed pixel data 1117 to reduce the artifacts of coding, particularly at boundaries of pixel blocks. In some embodiments, the filtering operation performed includes deblocking or sample adaptive offset (SAO). In some embodiment, the filtering operations include adaptive loop filter (ALF).

Figure 12A:
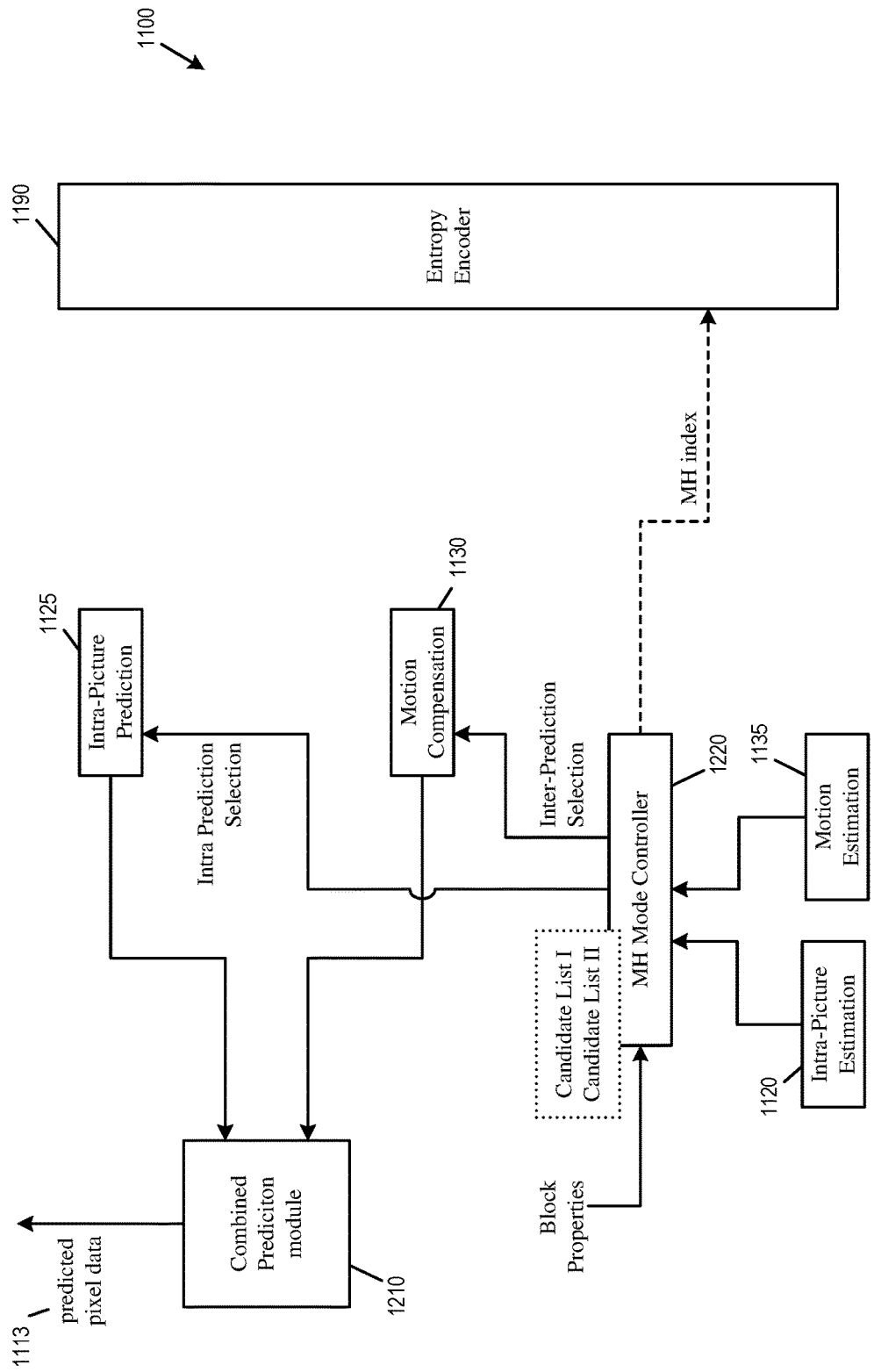
FIGS. 12a-b each illustrates portions of the video encoder that may implement MH mode when encoding a block of pixels.

FIG. 12a illustrates portions of the video encoder 1100 that may implement MH mode for Intra when encoding a block of pixels. As illustrated, the video encoder 1100 implements a combined prediction module 1210, which produces the predicted pixel data 1113. The combined prediction module 1210 receives intra-prediction values generated by the intra-picture prediction module 1125. The combined prediction module 1210 also receives inter-prediction values from the motion compensation module 1130. The motion information and mode directions used for encoding a pixel block by the motion compensation module 1130 and the intra-picture prediction module 1125 are saved in a storage for use by the same modules for subsequent blocks as candidates for merge mode or MH Intra.

A MH mode controller 1220 controls the operations of the intra-picture prediction module 1125 and the motion compensation module 1130 when MH mode for Intra is enabled (for the block or a portion of the block). The MH mode controller 1220 creates a list of inter-prediction modes (Candidate List I) and a list of intra-prediction modes (Candidate List II). The candidates of each list are determined or identified based on various factors, including the size, width, or height of the current block, and/or a direction of a corresponding motion candidate.

The MH mode controller 1220 selects an inter-prediction candidate from Candidate List I and an intra-prediction candidate from Candidate List II. The motion compensation module 1130 performs inter-prediction based on the candidate selected from Candidate List I. The intra-picture prediction module 1125 performs intra prediction based on the candidate selected from Candidate List II. The results of the inter-prediction and intra-prediction are combined (e.g., averaged) at the combined prediction module 1210 to generate the predicted pixel data 1113.

The MH mode controller also provides information to the entropy encoder 1190 to insert into the bitstream as syntax elements. Such syntax elements may signal whether MH mode for Intra is turned on. Such syntax elements may also explicitly signal the selection of the inter-prediction and intra-prediction candidates from candidate lists I and II for MH Intra. The syntax for signaling the selection of the inter-prediction and intra-prediction candidates may include one single index that selects the inter-prediction and intra-prediction candidates from one combined list that includes both Candidate list I and Candidate List II. The syntax for signaling the selection of the intra-prediction candidates and/or the inter-prediction candidate may be omitted (implicit signaling) if Candidate List I or Candidate List II has only one candidate.

Figure 12B:
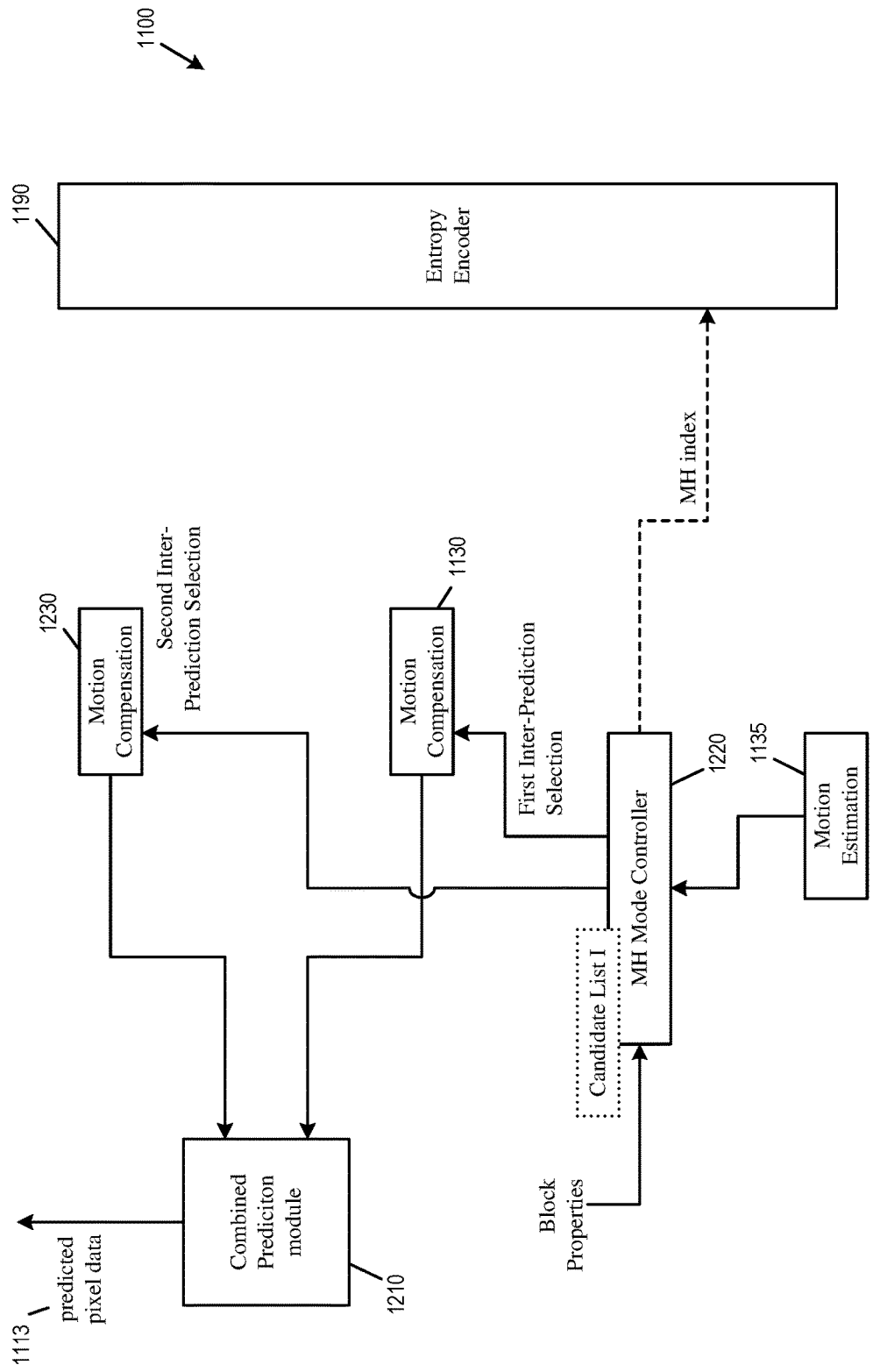

FIG. 12b illustrates portions of the video encoder 1100 that may implement MH mode for Inter when encoding a block of pixels. As illustrated, the video encoder 1100 implements the combined prediction module 1210, which produces the predicted pixel data 1113. The combined prediction module 1210 receives a first set of inter-prediction values from the motion compensation module 1130. The combined prediction module 1210 also receives a second set of inter-prediction values from the same motion compensation module 1130, or a secondary motion compensation module 1230. The two sets of motion information used for encoding a pixel block by the motion compensation module 1130 (and the secondary motion compensation module 1230) are saved in a storage for use by the same modules for subsequent blocks as candidates for merge mode or MH Inter.

The MH mode controller 1220 controls the operations of the motion compensation module 1130 (and the secondary motion compensation module 1230) when MH mode for Inter is enabled (for the block or a portion of the block). The MH mode controller 1220 creates a list of inter-prediction modes (Candidate List I). The candidates in the list are determined or identified based on various factors, including the size, width, or height of the current block, and/or a direction of a corresponding motion candidate.

The MH mode controller 1220 selects a first inter-prediction candidate and a second inter-prediction candidate from Candidate List I. The motion compensation module 1130 performs a first inter-prediction based on the first inter-prediction candidate selected from Candidate List I. The motion compensation module 1130 (or the secondary motion compensation module 1230) performs a second inter-prediction based on the second inter-prediction candidate selected from Candidate List I. The results of the first inter-prediction and the second inter-prediction are combined (e.g., averaged) at the combined prediction module 1210 to generate the predicted pixel data 1113.

The MH mode controller also provides information to the entropy encoder 1190 to insert into the bitstream as syntax elements. Such syntax elements may signal whether MH mode for Inter is turned on. Such syntax elements may also explicitly signal the selection of the first inter-prediction and the second inter-prediction candidates from Candidate list I for MH Inter. The syntax for signaling the selection of the first and second inter-prediction candidates may include one single index that selects the first inter-prediction candidates from Candidate List I and one single index that selects the second inter-prediction candidates from Candidate List I. The syntax for signaling the selection of the first and second inter-prediction candidates may include one single index that selects the two inter-prediction candidates from Candidate List I. The syntax for signaling the selection of the inter-prediction candidates may be omitted (implicit signaling) if Candidate List I has only one candidate.

Figure 13A:
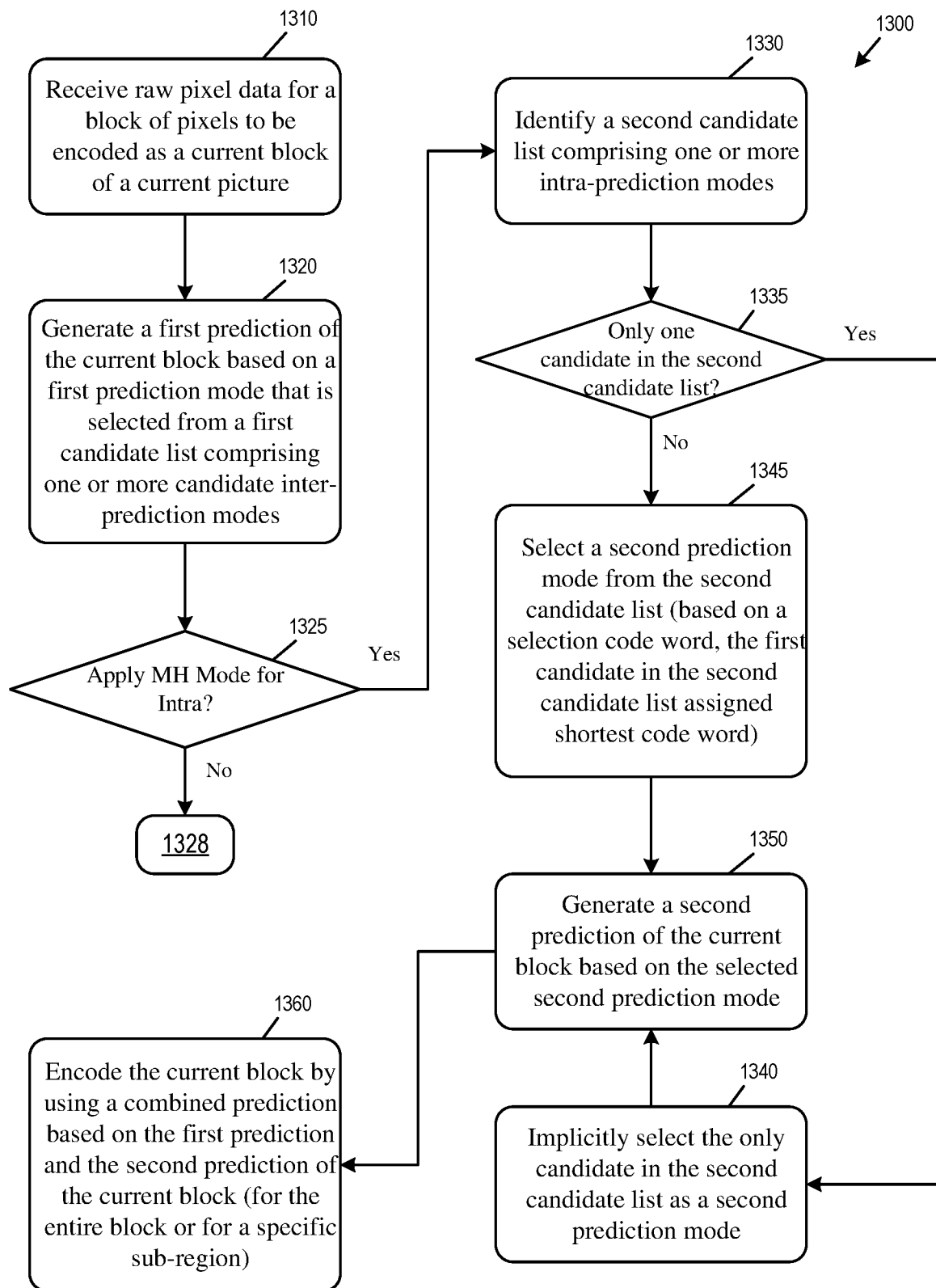
FIGS. 13a-b each conceptually illustrates a process that encodes a block of pixels using MH mode.
Figure 13B:
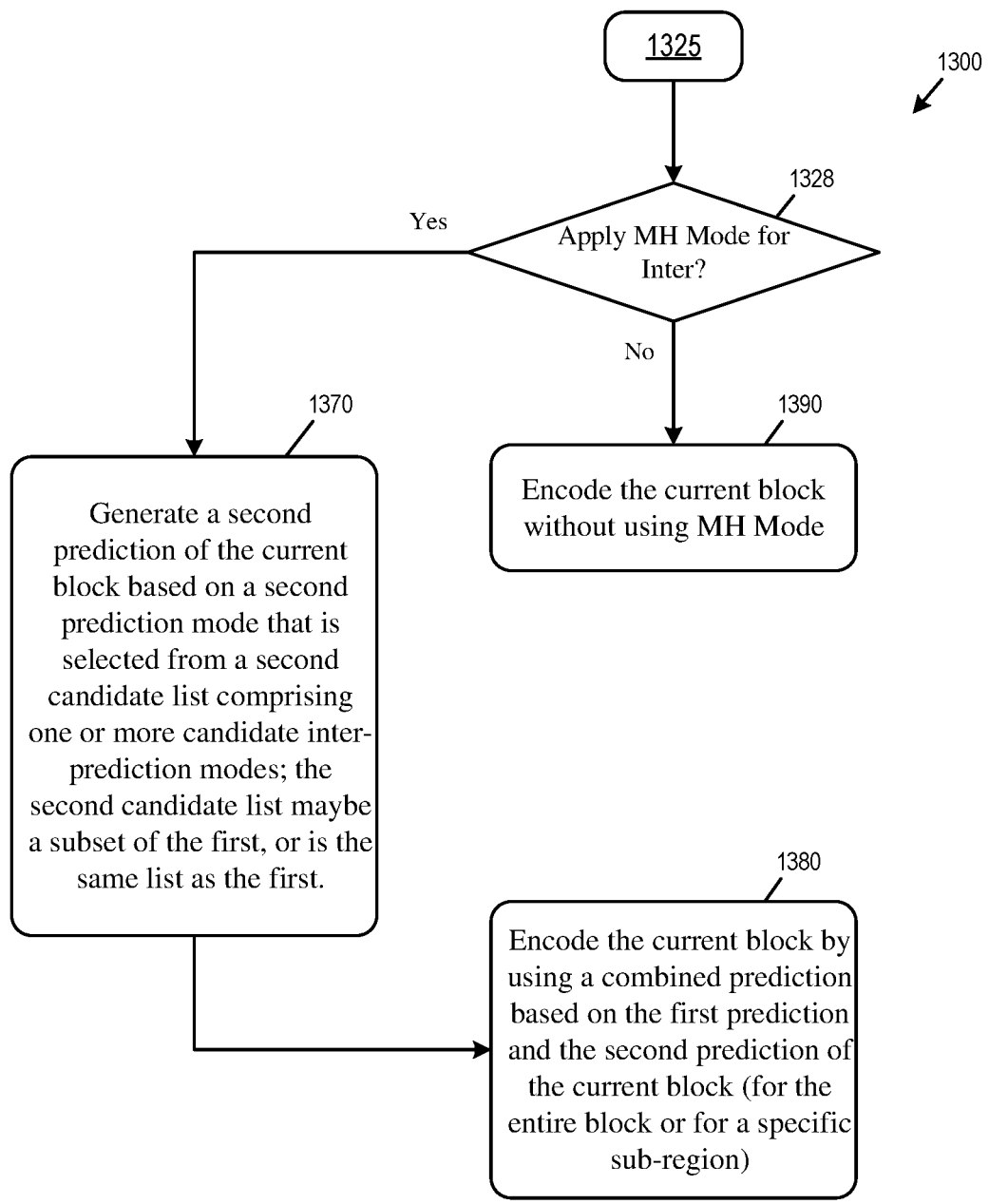

FIGS. 13a-b each conceptually illustrates a process 1300 that encodes a block of pixels using MH mode. In some embodiments, one or more processing units (e.g., a processor) of a computing device implementing the encoder 1100 performs the process 1300 by executing instructions stored in a computer readable medium. In some embodiments, an electronic apparatus implementing the encoder 1100 performs the process 1300.

The encoder receives (at step 1310) raw pixel or video data for a block of pixels to be encoded as a current block of a current picture. The encoder generates (at step 1320) a first prediction of the current block based on a first prediction mode that is selected from a first candidate list. The first candidate list (e.g., Candidate List I) includes one or more candidate inter-prediction modes. The first candidate list may be the same as the merge candidate list, or a subset of the merge candidate list. If MH Inter is to be used, the first prediction is the first inter-prediction and the first prediction mode is the first inter-prediction mode.

The encoder determines (at step 1325) whether to apply MH mode for Intra for the current block. If the MH mode for Intra is to be applied for the current block, the process proceeds to 1330. Otherwise, the encoder determines (at step 1328) whether to enable mode for Inter for the current block. If MH mode for Inter is to be applied for the current block, the process proceeds to 1370. The encoder may determine whether to enable MH mode Inter or Intra based on properties of the block, such as whether the block's height, width, or size is larger or smaller than a certain threshold. If the MH mode (Intra or Inter) is not to be applied, the encoder reconstructs (at step 1390) the current block without using MH mode, by using single hypothesis prediction (intra or inter) or by intra coding without prediction.

At 1330, the encoder identifies a second candidate list that includes one or more intra-prediction modes. The encoder may identify candidates for the second candidate list (e.g., Candidate List II) based on a property of the block or a direction of the first prediction mode. For example, the ordering of candidates in the second candidate list may be determined based on the direction of the first prediction mode (e.g., when the motion candidate for the first prediction mode is from the left neighboring block, or the direction of the first intra-prediction mode in the second candidate list is horizontal). For another example, the number of candidates in the second candidate list may be determined based on a width, height, or size of the current block.

The encoder determines (at step 1335) whether there is only one candidate in the second candidate list. If so, the process proceeds to 1340. If there are more than one candidate in the second candidate list, the process proceeds to 1345. In some other embodiments, there is always only one candidate in the second candidate list, and there is no need to perform step 1335.

At step 1340, the encoder selects the only candidate in the second candidate list as the second prediction mode without signaling it explicitly in the bitstream. The process then proceeds to 1350.

At step 1345, the encoder selects a second prediction mode from the second candidate list. The selection is signaled by a code word that is to be included in the bitstream as a syntax element. Different code words are assigned to different candidates in the second candidate list based on the candidates' ordering in the list. The candidate that is first in the list is assigned a shortest code word. The process then proceeds to 1350.

At step 1350, the encoder generates a second prediction of the current block based on the selected second prediction mode (by performing intra prediction). The encoder then encodes (at step 1360) the current block by using a combined prediction that is generated based on the first prediction and the second prediction of the current block. In some embodiments, the combined prediction of MH mode for Intra is applicable to only a portion of the current block, such as an overlap region between two prediction units as described by reference to FIGS. 7a-b and FIGS. 8a-b above. In some embodiments, the inter-prediction values and the intra-prediction values may be weighted differently when generating the combine prediction. In some embodiments, such weighting may vary based on the positions of the pixels or sub-blocks in the current block.

At step 1370 in FIG. 13b, the encoder generates a second inter-prediction of the current block based on a second inter-prediction mode that is selected from a second candidate list comprising one or more candidate inter-prediction modes. The second candidate list may be a subset of the first candidate list. The second candidate list may also be the same list of inter-prediction modes as the first candidate list. The process then proceeds to step 1380.

The encoder encodes (at step 1380) the current block by using a combined prediction that is generated based on the first inter-prediction and the second inter-prediction of the current block. In some embodiments, the combined prediction of MH mode for Inter is applicable to only a portion of the current block, such as an overlap region between two prediction units as described by reference to FIGS. 9a-b and FIGS. 10a-b above. In some embodiments, the inter-prediction values of the two inter-predictions may be weighted differently when generating the combine prediction. In some embodiments, such weighting may vary based on the positions of the pixels or sub-blocks in the current block.

Example Video Decoder

Figure 14:
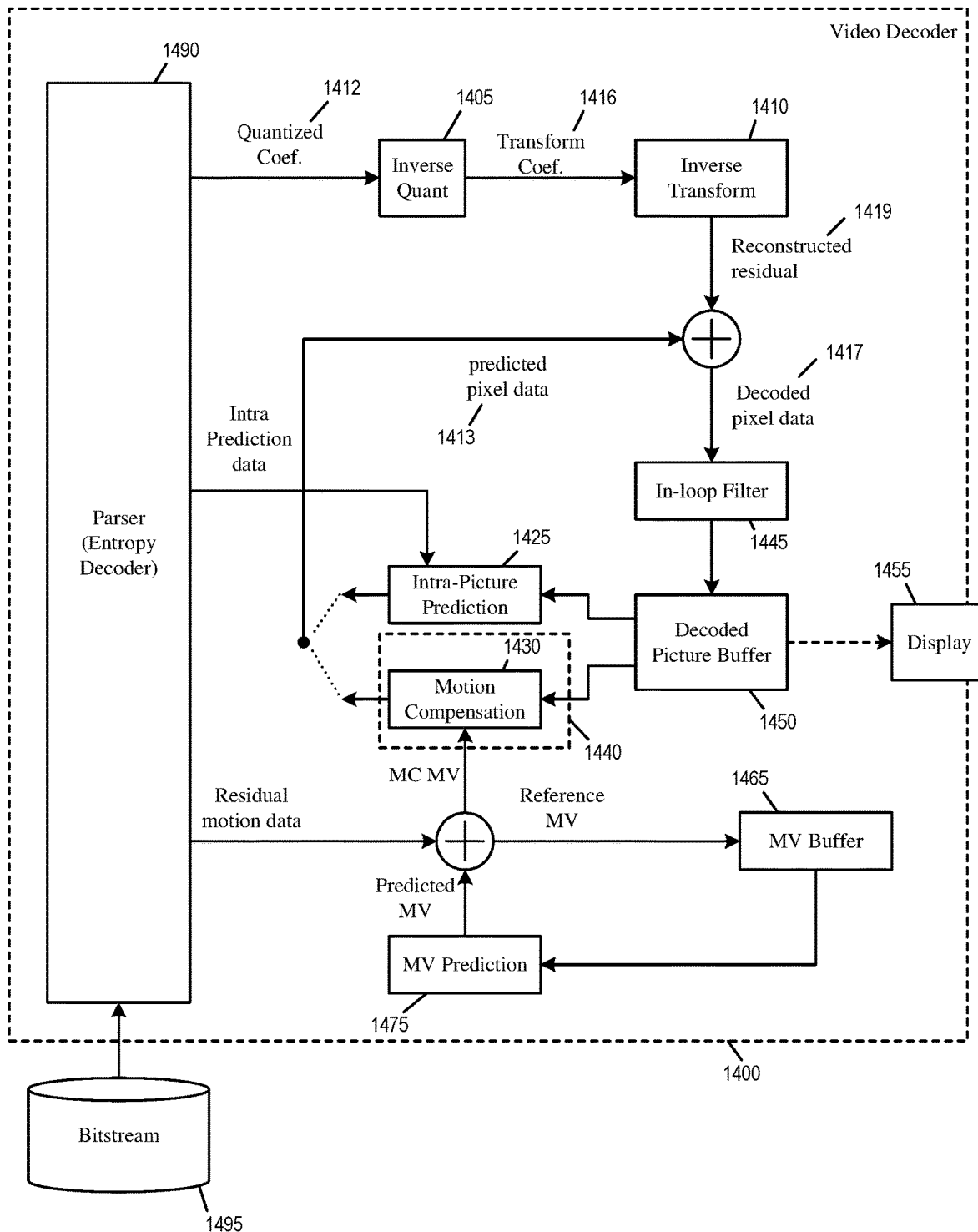
FIG. 14 illustrates an example video decoder that may implement MH mode.

FIG. 14 illustrates an example video decoder 1400 that may implement MH mode (MH Intra and/or MH Inter). As illustrated, the video decoder 1400 is an image-decoding or video-decoding circuit that receives a bitstream 1495 and decodes the content of the bitstream into pixel data of video frames for display. The video decoder 1400 has several components or modules for decoding the bitstream 1495, including at least part of an inverse quantization module 1405, an inverse transform module 1410, an intra-prediction module 1425, a motion compensation module 1430, an in-loop filter 1445, a decoded picture buffer 1450, a MV buffer 1465, a MV prediction module 1475, and a parser 1490. The motion compensation module 1430 is part of an inter-prediction module 1440.

In some embodiments, the modules 1410-1490 are modules of software instructions being executed by one or more processing units (e.g., a processor) of a computing device. In some embodiments, the modules 1410-1490 are modules of hardware circuits implemented by one or more ICs of an electronic apparatus. Though the modules 1410-1490 are illustrated as being separate modules, some of the modules can be combined into a single module.

The parser 1490 (or entropy decoder) receives the bitstream 1495 and performs initial parsing according to the syntax defined by a video-coding or image-coding standard. The parsed syntax element includes various header elements, flags, as well as quantized data (or quantized coefficients) 1412. The parser 1490 parses out the various syntax elements by using entropy-coding techniques such as context-adaptive binary arithmetic coding (CABAC) or Huffman encoding.

The inverse quantization module 1405 de-quantizes the quantized data (or quantized coefficients) 1412 to obtain transform coefficients, and the inverse transform module 1410 performs inverse transform on the transform coefficients 1416 to produce reconstructed residual signal 1419. The reconstructed residual signal 1419 is added with pre-dicted pixel data 1413 from the intra-prediction module 1425 or the motion compensation module 1430 to produce decoded pixel data 1417. The decoded pixels data are filtered by the in-loop filter 1445 and stored in the decoded picture buffer 1450. In some embodiments, the decoded picture buffer 1450 is a storage external to the video decoder 1400. In some embodiments, the decoded picture buffer 1450 is a storage internal to the video decoder 1400.

The intra-prediction module 1425 receives intra-prediction data from bitstream 1495 and according to which, produces the predicted pixel data 1413 from the decoded pixel data 1417 stored in the decoded picture buffer 1450. In some embodiments, the decoded pixel data 1417 is also stored in a line buffer (not illustrated) for intra-picture prediction and spatial MV prediction.

In some embodiments, the content of the decoded picture buffer 1450 is used for display. A display device 1455 either retrieves the content of the decoded picture buffer 1450 for display directly or retrieves the content of the decoded picture buffer to a display buffer. In some embodiments, the display device receives pixel values from the decoded picture buffer 1450 through a pixel transport.

The motion compensation module 1430 produces predicted pixel data 1413 from the decoded pixel data 1417 stored in the decoded picture buffer 1450 according to motion compensation MVs (MC MVs). These motion compensation MVs are decoded by adding the residual motion data received from the bitstream 1495 with predicted MVs received from the MV prediction module 1475.

The MV prediction module 1475 generates the predicted MVs based on reference MVs that were generated for decoding previous video frames, e.g., the motion compensation MVs that were used to perform motion compensation. The MV prediction module 1475 retrieves the reference MVs of previous video frames from the MV buffer 1465. The video decoder 1400 stores the motion compensation MVs generated for decoding the current video frame in the MV buffer 1465 as reference MVs for producing predicted MVs.

The in-loop filter 1445 performs filtering or smoothing operations on the decoded pixel data 1417 to reduce the artifacts of coding, particularly at boundaries of pixel blocks. In some embodiments, the filtering operation performed includes deblocking and/or sample adaptive offset (SAO). In some embodiment, the filtering operations include adaptive loop filter (ALF).

Figure 15A:
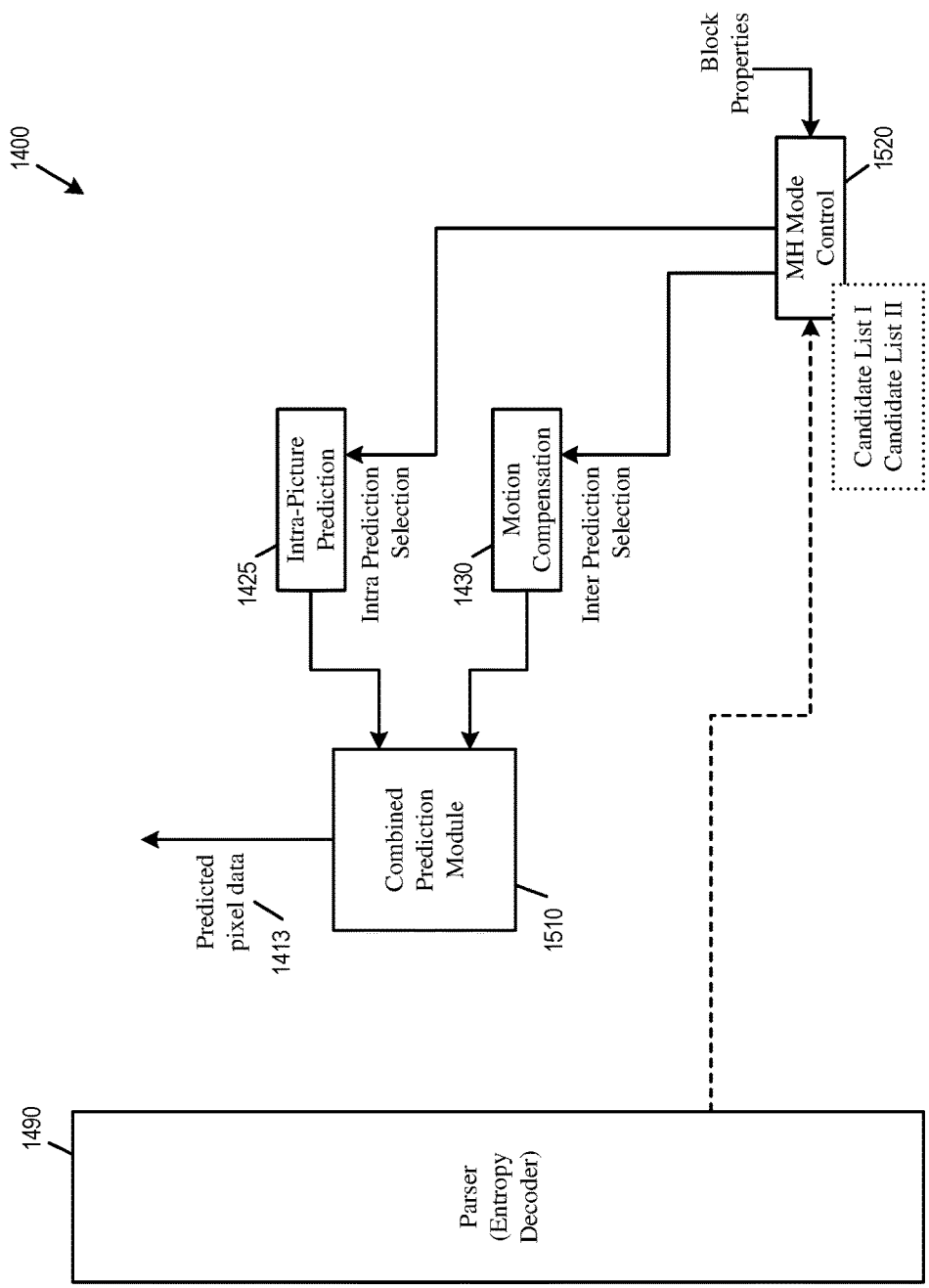
FIGS. 15a-b each illustrates portions of the video decoder that may implement MH mode when decoding a block of pixels.

FIG. 15a illustrates portions of the video decoder 1400 that may implement MH mode for Intra when decoding a block of pixels. As illustrated, the video decoder 1400 implements a combined prediction module 1510, which produces the predicted pixel data 1413. The combined prediction module 1510 receives intra-prediction values generated by the intra-picture prediction module 1425. The combined prediction module 1510 also receives inter-prediction values from the motion compensation module 1430. The motion information and mode directions used for decoding a pixel block by the motion compensation module 1430 and the intra-picture prediction module 1425 are saved in a storage for use by the same modules for subsequent blocks as candidates for merge mode or MH mode.

A MH mode controller 1520 controls the operations of the intra-picture prediction module 1425 and the motion compensation module 1430 when MH mode for Intra is enabled (for the block or a portion of the block). The MH mode controller 1520 creates a list of inter-prediction modes (Candidate List I) and a list of intra-prediction modes (Candidate List II). The candidates of each list are determined or identified based on various factors, including the size, width, or height of the current block, and/or a direction of a corresponding motion candidate.

The MH mode controller 1520 selects an inter-prediction candidate from Candidate List I and an intra-prediction candidate from Candidate List II. The motion compensation module 1430 performs inter-prediction based on the candidate selected from Candidate List I. The intra-picture prediction module 1425 performs intra prediction based on the candidate selected from Candidate List II. The results of the inter-prediction and intra-prediction are combined (e.g., averaged) at the combined prediction module 1510 to generate the predicted pixel data 1413.

The MH mode controller 1520 receives information from the parser 1490 based on syntax elements in the bitstream. Such syntax elements may signal whether MH mode for Intra is turned on. Such syntax elements may also explicitly signal the selection of the inter-prediction and intra-prediction candidates from candidate lists I and II for MH Intra. The syntax for signaling the selection of the inter-prediction and intra-prediction candidates may include one single index that selects the inter-prediction candidates from Candidate List I and one single index that selects the intra-prediction candidates from Candidate List II. The syntax for signaling the selection of the inter-prediction and intra-prediction candidates may include one single index that selects the inter-prediction and intra-prediction candidates from one combined list that includes both candidates list I and Candidate List II. The syntax for signaling the selection of the intra-prediction candidates and/or the inter-prediction candidate may be omitted (implicit signaling) if Candidate List I or Candidate List II has only one candidate.

Figure 15B:
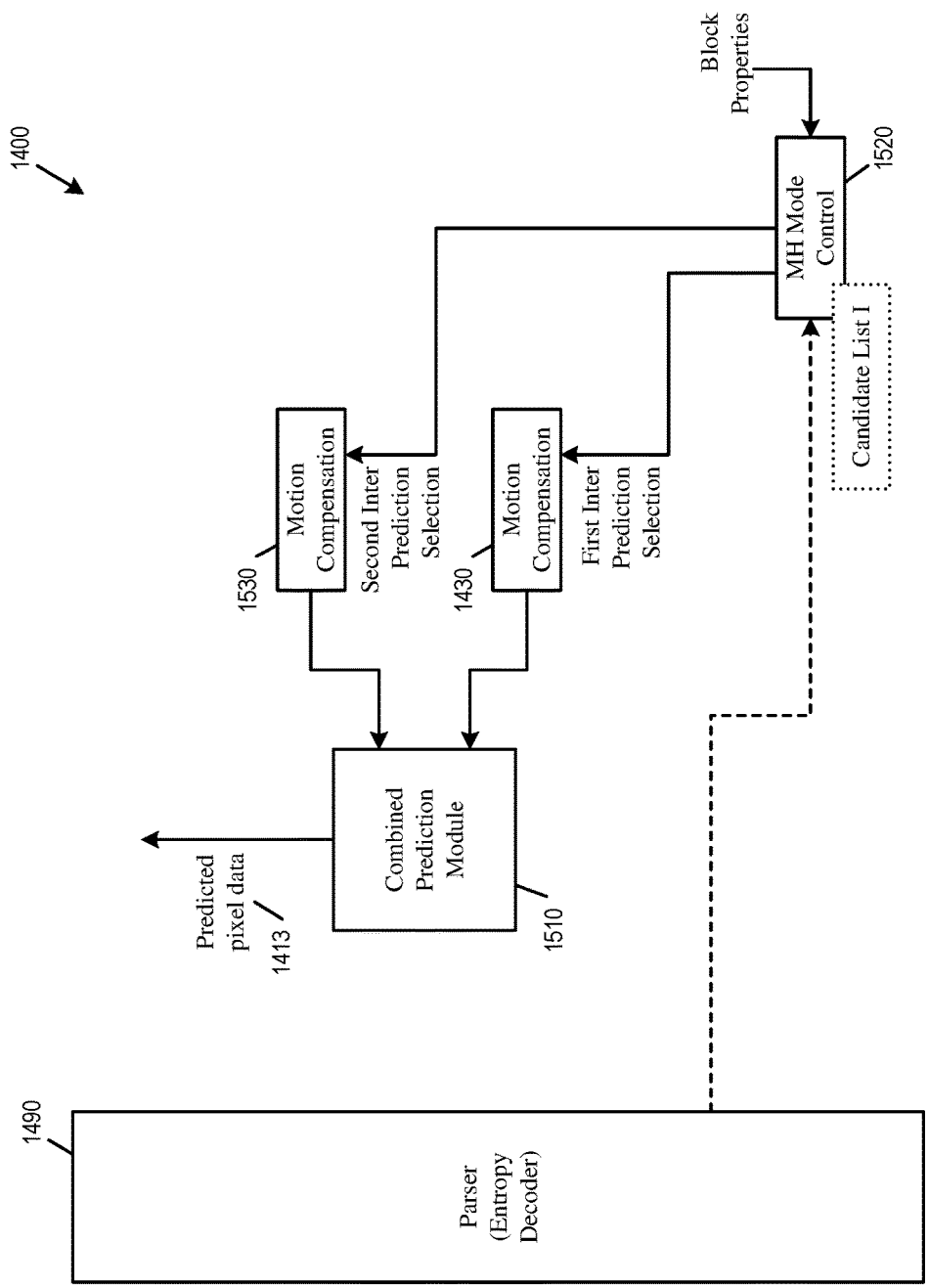

FIG. 15b illustrates portions of the video decoder 1400 that may implement MH mode for Inter when decoding a block of pixels. As illustrated, the video decoder 1400 implements a combined prediction module 1510, which produces the predicted pixel data 1413. The combined prediction module 1510 receives a first set of inter-prediction values from the motion compensation module 1430. The combined prediction module 1510 also receives a second set of inter-prediction values from the same motion compensation module 1430, or a secondary motion compensation module 1530. The two sets of motion information used for encoding a pixel block by the motion compensation module 1430 (and the secondary motion compensation module 1530) are saved in a storage for use by the same modules for subsequent blocks as candidates for merge mode or MH Inter.

The MH mode controller 1520 controls the operations of the motion compensation module 1430 (and the secondary motion compensation module 1530) when MH mode for Inter is enabled (for the block or a portion of the block). The MH mode controller 1520 creates a list of inter-prediction modes (Candidate List I). The candidates in the list are determined or identified based on various factors, including the size, width, or height of the current block, and/or a direction of a corresponding motion candidate (If the motion candidate is from the left neighboring block, the direction is horizontal).

The MH mode controller 1520 selects a first inter-prediction candidate and a second inter-prediction candidate from Candidate List I. The motion compensation module 1430 performs a first inter-prediction based on the first inter-prediction candidate selected from Candidate List I. The same motion compensation module 1430 (or the secondary motion compensation module 1530) performs a second inter-prediction based on the second inter-prediction candidate selected from Candidate List I. The results of the first inter-prediction and the second inter-prediction are combined (e.g., averaged) at the combined prediction module 1510 to generate the predicted pixel data 1413.

The MH mode controller receives information parsed by the entropy decoder 1490 from syntax elements in the bitstream. Such syntax elements may signal whether MH mode for Inter is turned on. Such syntax elements may also explicitly signal the selection of the first inter-prediction and the second inter-prediction candidates from Candidate list I for MH Inter. The syntax for signaling the selection of the first and second inter-prediction candidates may include one single index that selects the two inter-prediction candidates from Candidate List I. The syntax for signaling the selection of the inter-prediction candidates may be omitted (implicit signaling) if Candidate List I has only one candidate.

Figure 16A:
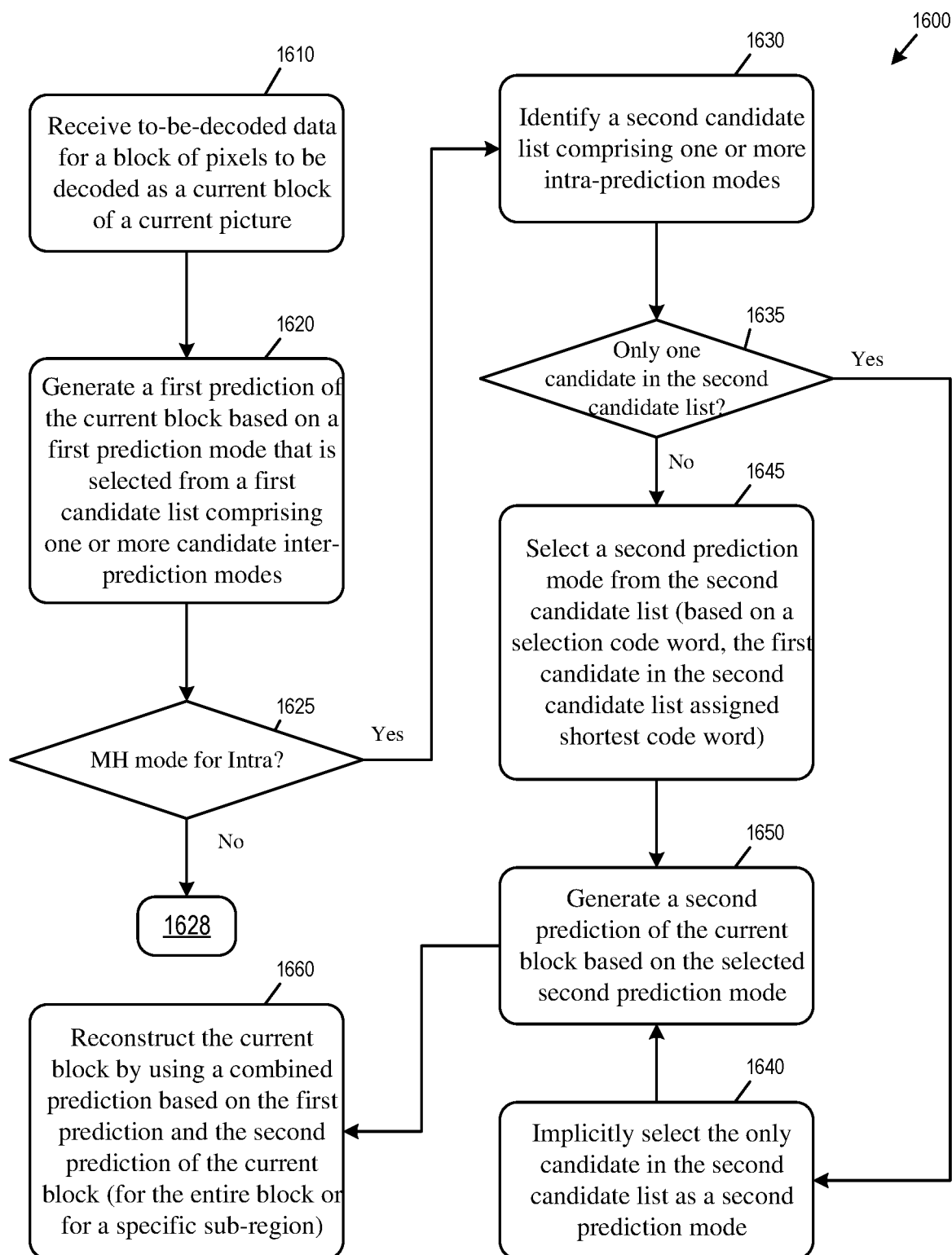
FIGS. 16a-b each conceptually illustrates a process that decodes a block of pixels using MH mode FIG. 17 conceptually illustrates an electronic system with which some embodiments of the present disclosure are implemented.
Figure 16B:
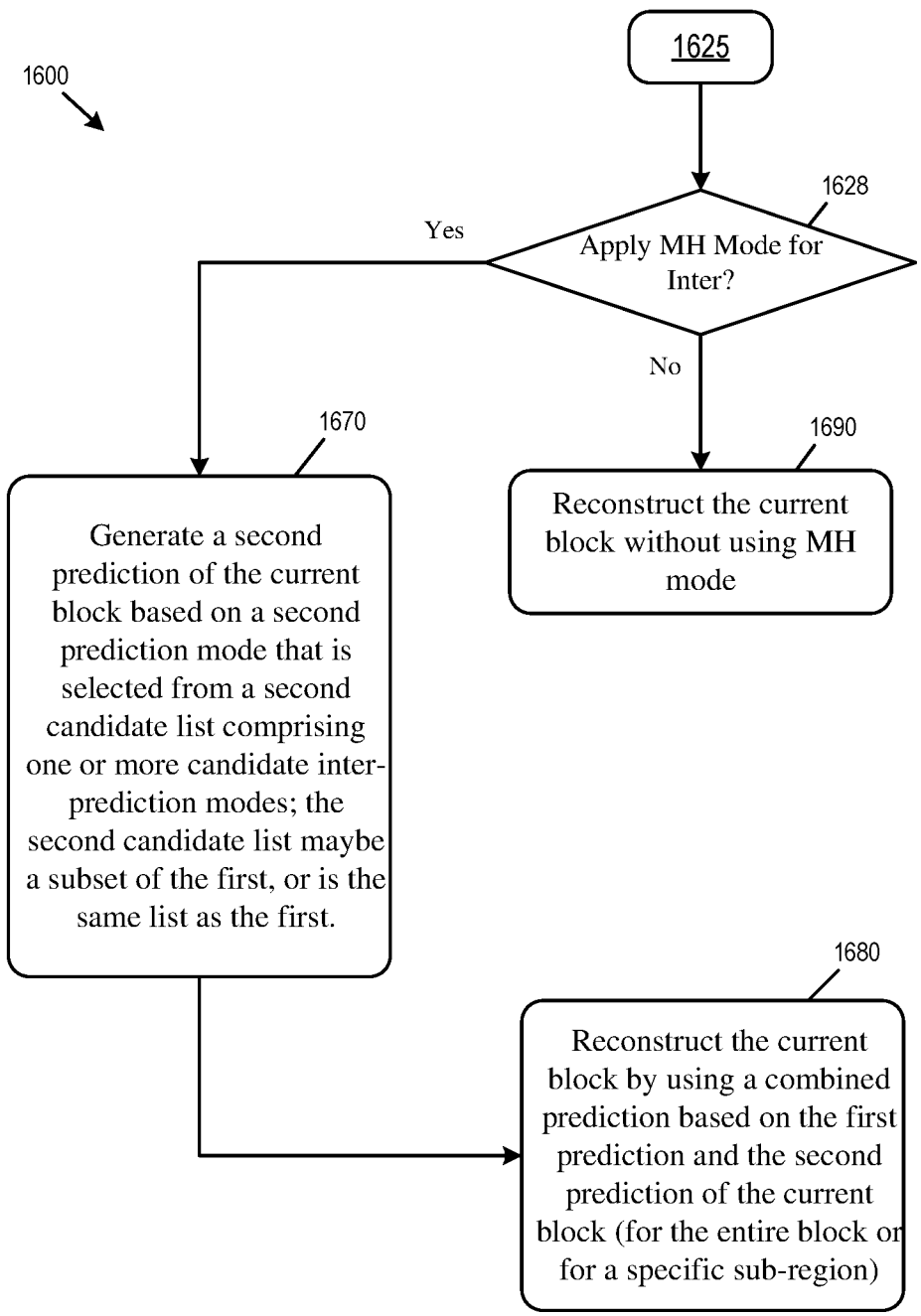

FIGS. 16a-b each conceptually illustrates a process 1600 that decodes a block of pixels using MH mode. In some embodiments, one or more processing units (e.g., a processor) of a computing device implementing the decoder 1400 performs the process 1600 by executing instructions stored in a computer readable medium. In some embodiments, an electronic apparatus implementing the decoder 1400 performs the process 1600.

The decoder receives (at step 1610) to-be-decoded data for a block of pixels to be decoded as a current block of a current picture. The decoder generates (at step 1620) a first prediction of the current block based on a first prediction mode that is selected from a first candidate list. The first candidate list (e.g., Candidate List I) includes one or more candidate inter-prediction modes. The first candidate list may be the same as the merge candidate list, or a subset of the merge candidate list. If MH Inter is to be used, the first prediction is the first inter-prediction and the first prediction mode is the first inter-prediction mode.

The decoder determines (at step 1625) whether to apply MH mode for Intra for the current block. If the MH mode for Intra is to be applied for the current block, the process proceeds to 1630. Otherwise, the decoder determines (at step 1628) whether to enable mode for Inter for the current block. If MH mode for Inter is to be applied for the current block, the process proceeds to 1670. The decoder may determine whether to enable MH mode Inter or Intra based on properties of the block, such as whether the block's height, width, or size is larger or smaller than a certain threshold. If the MH mode (Intra or Inter) is not to be applied, the decoder reconstructs (at step 1690) the current block without using MH mode for Intra, such as by using single hypothesis prediction (intra or inter) or by intra coding without prediction.

At 1630, the decoder identifies a second candidate list that includes one or more intra-prediction modes. The decoder may identify candidates for the second candidate list (e.g., Candidate List II) based on a property of the block or a direction of the first prediction mode. For example, the ordering of candidates in the second candidate list may be determined based on their angular distances from the direction of the first prediction mode (i.e., the direction of the motion). For another example, the number of candidates in the second candidate list may be determined based on a width, height, or size of the current block.

The decoder determines (at step 1635) whether there is only one candidate in the second candidate list. If so, the process proceeds to 1640. If there are more than one candidate in the second candidate list, the process proceeds to 1645.

At step 1640, the decoder implicitly selects the only candidate in the second candidate list as the second prediction mode. In other words, the decoder selects/uses the only candidate without using a syntax element in the bitstream. The process then proceeds to 1650.

At step 1645, the decoder selects a second prediction mode from the second candidate list. The selection may be based on a code word that is signaled in the bitstream as a syntax element. Different code words are assigned to different candidates in the second candidate list based on the candidates' ordering in the list. The candidate that is first in the list is assigned a shortest code word. The process then proceeds to 1650.

At step 1650, the decoder generates a second prediction of the current block based on the selected second prediction mode (by performing intra prediction). The decoder then reconstructs (at step 1660) the current block by using a combined prediction that is generated based on the first prediction and the second prediction of the current block. In some embodiments, the combined prediction of MH mode for Intra is applicable to only a portion of the current block, such as an overlap region between two prediction units as described by reference to FIGS. 7*a-b* and FIGS. 8*a-b* above. In some embodiments, the inter-prediction values and the intra-prediction values may be weighted differently when generating the combine prediction. In some embodiments, such weighting may vary based on the positions of the pixels or sub-blocks in the current block.

At step 1670, the decoder generates a second inter-prediction of the current block based on a second inter-prediction mode that is selected from a second candidate list comprising one or more candidate inter-prediction modes. The second candidate list maybe a subset of the first candidate list. The second candidate list may also be the same list of inter-prediction modes as the first candidate list.

The decoder then reconstructs (at step 1680) the current block by using a combined prediction that is generated based on the first inter-prediction and the second inter-prediction of the current block. In some embodiments, the combined prediction of MH mode for Inter is applicable to only a portion of the current block, such as an overlap region between two prediction units as described by reference to FIGS. 9*a-b* and FIGS. 10*a-b* above. In some embodiments, the inter-prediction values of the two inter-predictions may be weighted differently when generating the combine prediction. In some embodiments, such weighting may vary based on the positions of the pixels or sub-blocks in the current block.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 17:
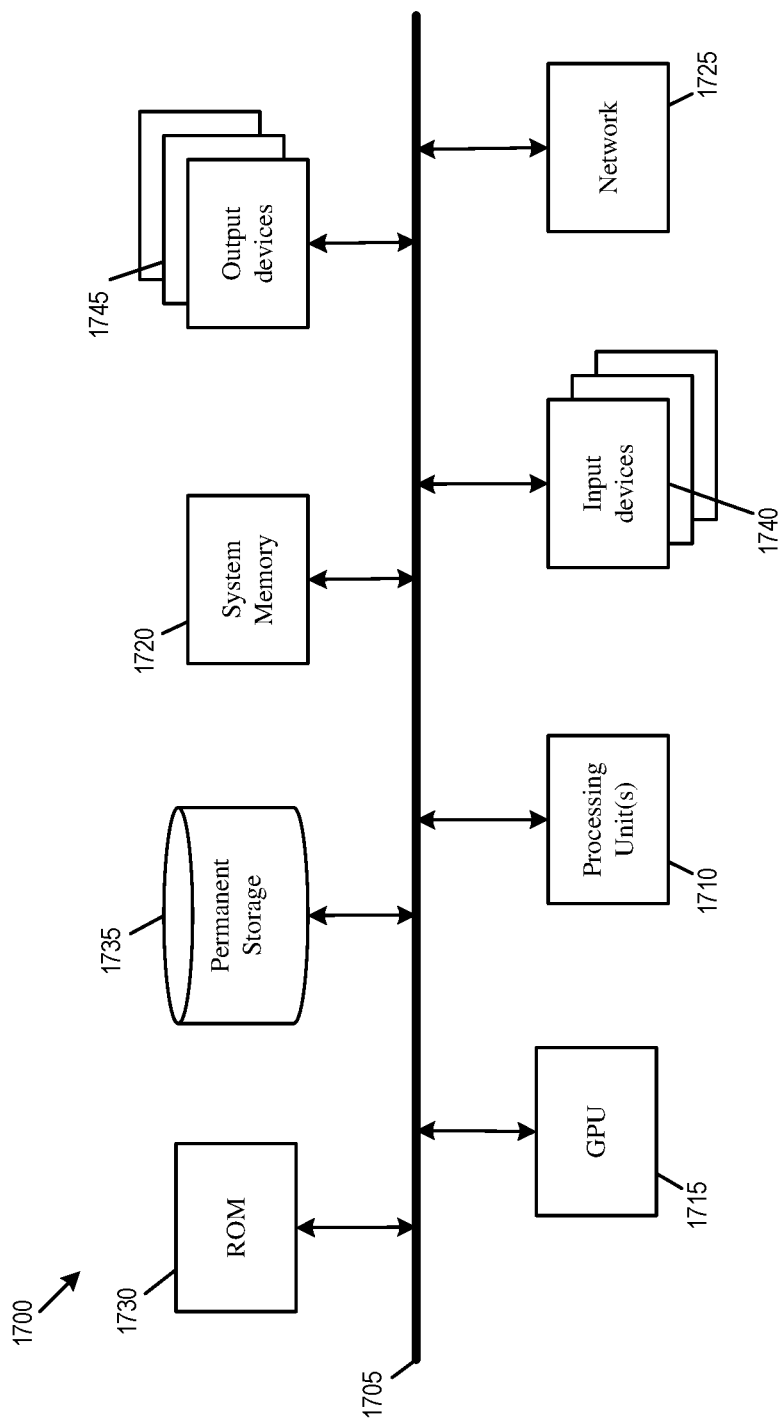

FIG. 17 conceptually illustrates an electronic system 1700 with which some embodiments of the present disclosure are implemented. The electronic system 1700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1700 includes a bus 1705, processing unit(s) 1710, a graphics-processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the GPU 1715, the read-only memory 1730, the system memory 1720, and the permanent storage device 1735.

From these various memory units, the processing unit(s) 1710 retrieves instructions to execute and data to process in order to execute the processes of the present disclosure. The processing unit(s) may be a single processor or a multi-core processor in different embodiments. Some instructions are passed to and executed by the GPU 1715. The GPU 1715 can offload various computations or complement the image processing provided by the processing unit(s) 1710.

The read-only-memory (ROM) 1730 stores static data and instructions that are used by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the present disclosure use a mass-storage device (such as a magnetic or optical disk and its corresponding disk drive) as the permanent storage device 1735.

Other embodiments use a removable storage device (such as a floppy disk, flash memory device, etc., and its corresponding disk drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor uses at runtime. In some embodiments, processes in accordance with the present disclosure are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alpha-numeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 13a-b and 16a-b) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
   receiving to-be-decoded data from a bitstream for a block of pixels to be decoded as a current block of a current picture of a video;
   generating a first prediction of the current block according to an inter-prediction mode and a selected motion candidate selected from a candidate list, the candidate list including one or more motion candidates;
   generating a second prediction of the current block according to a selected intra-prediction mode selected from one or more candidate intra-prediction modes that include a directional intra-prediction mode, a DC mode, or a Planar mode;
   generating a combined prediction for the current block based on the first prediction and the second prediction; and
   reconstructing the current block according to the combined prediction.

2. The method of claim 1, wherein the candidate list is identical to a merge candidate list of the current block.

3. The method of claim 1, wherein the candidate list is a subset of a merge candidate list of the current block.

4. The method of claim 1, further comprising determining whether to generate the second prediction based on an explicit flag in the bitstream.

5. The method of claim 4, further comprising determining whether to parse the explicit flag from the bitstream based on a width, a height, or a size of the current block.

6. The method of claim 1, further comprising determining whether to generate the second prediction based on a width, a height, or a size of the current block.

7. The method of claim 1, wherein the second prediction mode is selected based on an ordering of the one or more candidate intra-prediction modes that is determined based on a width, a height, or a size of the current block.

8. The method of claim 1, wherein the intra-prediction mode is selected based on the selected inter-prediction mode.

9. The method of claim 1, wherein selection information for the selected motion candidate or the selected intra-prediction mode is signaled by using a shortest code word.

10. The method of claim 1, wherein a number of the one or more candidate intra-prediction modes for the current block is determined based on a width, a height, or a size of the current block.

11. The method of claim 1, wherein the one or more candidate intra-prediction modes include only one candidate intra-prediction mode.

12. The method of claim 11, wherein the only one candidate intra-prediction mode is identified based on a ratio between a width of the current block and a height of the current block.

13. The method of claim 1, wherein the candidate list is a subset of a merge candidate list of the current block that comprises spatial candidates but not temporal candidates.

14. The method of claim 1, wherein the combined prediction is applicable to a sub-region of the current block and not outside of the sub-region of the current block, and wherein a size of the sub-region is determined based on a width, height, or size of the current block.

15. A video encoding method, comprising:
    receiving raw pixel data for a block of pixels to be encoded as a current block of a current picture of a video into a bitstream;
    generating a first prediction of the current block according to an inter-prediction mode and a selected motion candidate selected from a candidate list, the candidate list including one or more motion candidates;
    generating a second prediction of the current block according to a selected intra-prediction mode selected from one or more candidate intra-prediction modes that include a directional intra-prediction mode, a DC mode, or a Planar mode;
    generating a combined prediction for the current block based on the first prediction and the second prediction; and
    encoding the current block into the bitstream according to the combined prediction.

16. An electronic apparatus, comprising:
    a processing circuit configured to:
      receive data to be encoded or decoded as a current block of a current picture of a video;
      generate a first prediction of the current block according to an inter-prediction mode and a selected motion candidate selected from a candidate list, the candidate list including one or more motion candidates;

generate a second prediction of the current block according to a selected intra-prediction mode selected from one or more candidate intra-prediction modes that include a directional intra-prediction mode, a DC mode, or a Planar mode;

generate a combined prediction for the current block based on the first prediction and the second prediction; and encode the current block into a bitstream or reconstruct the current block according to the combined prediction.

\* \* \* \* \*